United States Patent
Grichnik et al.

(10) Patent No.: US 11,610,588 B1
(45) Date of Patent: Mar. 21, 2023

(54) GENERATING CONTEXTUALLY RELEVANT TEXT TRANSCRIPTS OF VOICE RECORDINGS WITHIN A MESSAGE THREAD

(71) Applicant: Meta Platforms, Inc., Menlo Park, CA (US)

(72) Inventors: James Matthew Grichnik, Redwood City, CA (US); Chetan Parag Gupta, San Francisco, CA (US); Fuchun Peng, Palo Alto, CA (US); Yinan Zhang, Fremont, CA (US); Si Chen, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 291 days.

(21) Appl. No.: 16/666,157

(22) Filed: Oct. 28, 2019

(51) Int. Cl.
| | |
|---|---|
| *G10L 15/26* | (2006.01) |
| *G06Q 50/00* | (2012.01) |
| *H04W 4/21* | (2018.01) |
| *H04L 67/306* | (2022.01) |
| *G10L 15/08* | (2006.01) |

(Continued)

(52) U.S. Cl.
CPC .............. *G10L 15/26* (2013.01); *G06Q 50/01* (2013.01); *G10L 15/08* (2013.01); *H04L 51/216* (2022.05); *H04L 51/52* (2022.05); *H04L 67/306* (2013.01); *H04W 4/21* (2018.02)

(58) Field of Classification Search
CPC ...... G06F 17/27; G06F 16/951; G06F 16/313; G06F 21/6254; G06Q 30/02; H04L 63/0428; G10L 15/08
See application file for complete search history.

(56) References Cited

U.S. PATENT DOCUMENTS

| | | | |
|---|---|---|---|
| 7,539,619 B1 * | 5/2009 | Seligman ................ | G10L 15/30 704/277 |
| 8,521,526 B1 * | 8/2013 | Lloyd ................ | G06F 16/3344 704/251 |

(Continued)

OTHER PUBLICATIONS

Imran Sheikh et al.; "Learning Word Importance with the Neural Bag-of-Words Model"; Downloaded Nov. 7, 2019; https://www.aclweb.org/anthology/W16-1626/.

(Continued)

*Primary Examiner* — Mahran Y Abu Roumi
(74) *Attorney, Agent, or Firm* — Keller Preece PLLC

(57) ABSTRACT

The present disclosure relates to systems, non-transitory computer-readable media, and methods for generating contextually relevant transcripts of voice recordings based on social networking data. For instance, the disclosed systems receive a voice recording from a user corresponding to a message thread including the user and one or more co-users. The disclosed systems analyze acoustic features of the voice recording to generate transcription-text probabilities. The disclosed systems generate term weights for terms corresponding to objects associated with the user within a social networking system by analyzing user social networking data. Using the contextually aware term weights, the disclosed systems adjust the transcription-text probabilities. Based on the adjusted transcription-text probabilities, the disclosed systems generate a transcript of the voice recording for display within the message thread.

20 Claims, 14 Drawing Sheets

(51) Int. Cl.
*H04L 51/52* (2022.01)
*H04L 51/216* (2022.01)

(56) References Cited

U.S. PATENT DOCUMENTS

| | | | | |
|---|---|---|---|---|
| 10,438,587 | B1* | 10/2019 | Lam | G10L 15/14 |
| 10,614,074 | B1* | 4/2020 | Darling | G06F 16/951 |
| 10,764,431 | B1* | 9/2020 | Pham | H04M 3/5166 |
| 2010/0306185 | A1* | 12/2010 | Smith | G06Q 30/0269 |
| | | | | 707/709 |
| 2011/0013756 | A1* | 1/2011 | Davies | G10L 15/22 |
| | | | | 379/88.14 |
| 2013/0024521 | A1* | 1/2013 | Pocklington | H04L 51/16 |
| | | | | 709/206 |
| 2013/0036117 | A1* | 2/2013 | Fisher | G06F 16/435 |
| | | | | 707/736 |
| 2013/0282417 | A1* | 10/2013 | Gaedcke | G06Q 30/0201 |
| | | | | 705/7.13 |
| 2013/0282430 | A1* | 10/2013 | Kannan | G06Q 30/02 |
| | | | | 705/7.29 |
| 2014/0143018 | A1* | 5/2014 | Nies | G06Q 30/0201 |
| | | | | 705/7.29 |
| 2014/0358533 | A1* | 12/2014 | Kurata | G10L 15/08 |
| | | | | 704/231 |
| 2015/0006651 | A1* | 1/2015 | Chmara | H04L 51/04 |
| | | | | 709/206 |
| 2015/0088784 | A1* | 3/2015 | Dhara | G06N 5/02 |
| | | | | 706/11 |
| 2015/0095770 | A1* | 4/2015 | Mani | G06F 40/258 |
| | | | | 715/254 |
| 2015/0120680 | A1* | 4/2015 | Alonso | G06F 16/9535 |
| | | | | 707/692 |
| 2015/0248898 | A1* | 9/2015 | Loukina | G09B 19/04 |
| | | | | 704/239 |
| 2016/0026962 | A1* | 1/2016 | Shankar | G06Q 10/06398 |
| | | | | 705/7.42 |
| 2016/0028679 | A1* | 1/2016 | Haeupler | H04L 51/30 |
| | | | | 709/206 |
| 2016/0072741 | A1* | 3/2016 | Hamilton | H04L 51/04 |
| | | | | 709/206 |
| 2016/0267904 | A1* | 9/2016 | Biadsy | G10L 15/08 |
| 2017/0126786 | A1* | 5/2017 | Satkunarajah | G06Q 50/01 |
| 2017/0193999 | A1* | 7/2017 | Aleksic | G10L 15/26 |
| 2018/0012594 | A1* | 1/2018 | Behzadi | G10L 15/183 |
| 2018/0053507 | A1* | 2/2018 | Wang | G10L 15/18 |
| 2018/0082680 | A1* | 3/2018 | Pereg | G10L 15/1822 |
| 2018/0233131 | A1* | 8/2018 | Aleksic | G10L 15/187 |
| 2018/0309873 | A1* | 10/2018 | Raanani | G06F 40/289 |
| 2019/0027133 | A1* | 1/2019 | Georges | G10L 15/1815 |
| 2019/0073640 | A1* | 3/2019 | Udezue | H04L 51/043 |
| 2019/0205395 | A1* | 7/2019 | Bonin | G06F 16/345 |
| 2019/0238516 | A1* | 8/2019 | Weggenmann | G06F 21/6254 |
| 2019/0362645 | A1* | 11/2019 | Miller | G06N 5/041 |
| 2020/0043074 | A1* | 2/2020 | Doh | G06Q 50/12 |
| 2020/0074475 | A1* | 3/2020 | Zabrzenski | H04L 51/02 |
| 2020/0090640 | A1* | 3/2020 | Kim | G10L 15/26 |
| 2020/0175969 | A1* | 6/2020 | Aleksic | G10L 15/1822 |
| 2020/0192986 | A1* | 6/2020 | Zhang | G10L 15/16 |
| 2020/0250277 | A1* | 8/2020 | Mallette | G06F 40/35 |
| 2020/0272690 | A1* | 8/2020 | Howard | G06F 16/90335 |
| 2020/0401765 | A1* | 12/2020 | Ran | G06F 40/30 |

OTHER PUBLICATIONS

Tara N. Sainath et al.; Google AI Blog—Improving End-to-End Models for Speech Recognition; Dec. 14, 2017; https://ai.googleblog.com/2017/12/improving-end-to-end-models-for-speech.html.

* cited by examiner

US 11,610,588 B1

GENERATING CONTEXTUALLY RELEVANT TEXT TRANSCRIPTS OF VOICE RECORDINGS WITHIN A MESSAGE THREAD

BACKGROUND

Digital messaging systems can send various types of digital content between two or more users within digital messages. For example, digital messaging systems can send messages comprising text, video, image, and audio data. In addition, some digital messaging systems can transcribe speech within audio files to generate text messages.

Although conventional digital messaging systems and conventional automatic-speech-recognition systems can generate text transcripts of audio clips, these systems continue to suffer from a number of disadvantages, particularly with respect to accuracy and efficiency. For example, conventional systems often inaccurately analyze or detect the sound captured in speech recordings. Some such conventional systems cannot accurately detect sounds because of poor audio quality and poor clarity of a recording. Even if speech in an audio file is clear, conventional systems often mis-analyze speech when the speaker has a unique accent or pronounces words differently than some other users. Based upon erroneous sound analysis, for example, conventional systems often generate transcripts that contain phonetic inconsistencies with the speech recording.

In addition to mis-analyzing audio files, conventional digital messaging systems and conventional automatic-speech-recognition systems often produce transcripts with misspellings or other seeming typographical errors. Even if a conventional system correctly captures phonetic patterns of a speech recording, the conventional system may produce transcripts with errors in capitalization, punctuation, spelling, and spacing. For example, conventional systems often misspell names of people, locations, entities, and other things. Conventional systems also often wholly fail to recognize certain proper nouns (e.g., names) and instead substitute one or more phonetically similar words for the proper noun.

Beyond misspellings and other incorrect text, conventional systems often utilize additional computing resources to facilitate correcting errors. In particular, conventional systems must often utilize computing and storage resources to apply and correct speech-to-text transcriptions. For instance, many conventional systems utilize computing resources to generate inaccurate text for a speech recording. To correct the inaccuracies, the conventional systems utilize additional computing resources to collect corrections from users. The conventional systems often store correction information to improve accuracy. But storage of correction information can also often be ineffective or unnecessarily consume storage or other computing resources, especially when individual user data is inapplicable to the general user population and/or vice versa.

These and other disadvantages exist with respect to conventional digital communication systems.

SUMMARY

This disclosure describes one or more embodiments of methods, non-transitory computer readable media, and systems that solve the foregoing problems and provide other benefits. For example, the disclosed systems generate digital messages that include transcriptions of voice recordings of a user based on contextual data from a social networking system. In some cases, the disclosed system initially predicts transcription-text probabilities for transcribing a voice recording corresponding to a message thread by analyzing acoustic features of the voice recording. Based on receiving and analyzing the voice recording for the message thread, the disclosed system accesses social networking data corresponding to the user to extract contextual data. The disclosed systems further utilize the extracted contextual data to adjust the transcription-text probabilities for transcribing the voice recording. Based on the adjusted transcription-text probabilities, the disclosed systems generate a transcript of the voice recording for display within the message thread. The disclosed system can accordingly utilize social networking data to improve the accuracy of voice-to-text transcriptions by applying contextual data from a social networking system to voice content.

BRIEF DESCRIPTION OF THE DRAWINGS

The detailed description refers to the drawings briefly described below.

DETAILED DESCRIPTION

Figure 1:
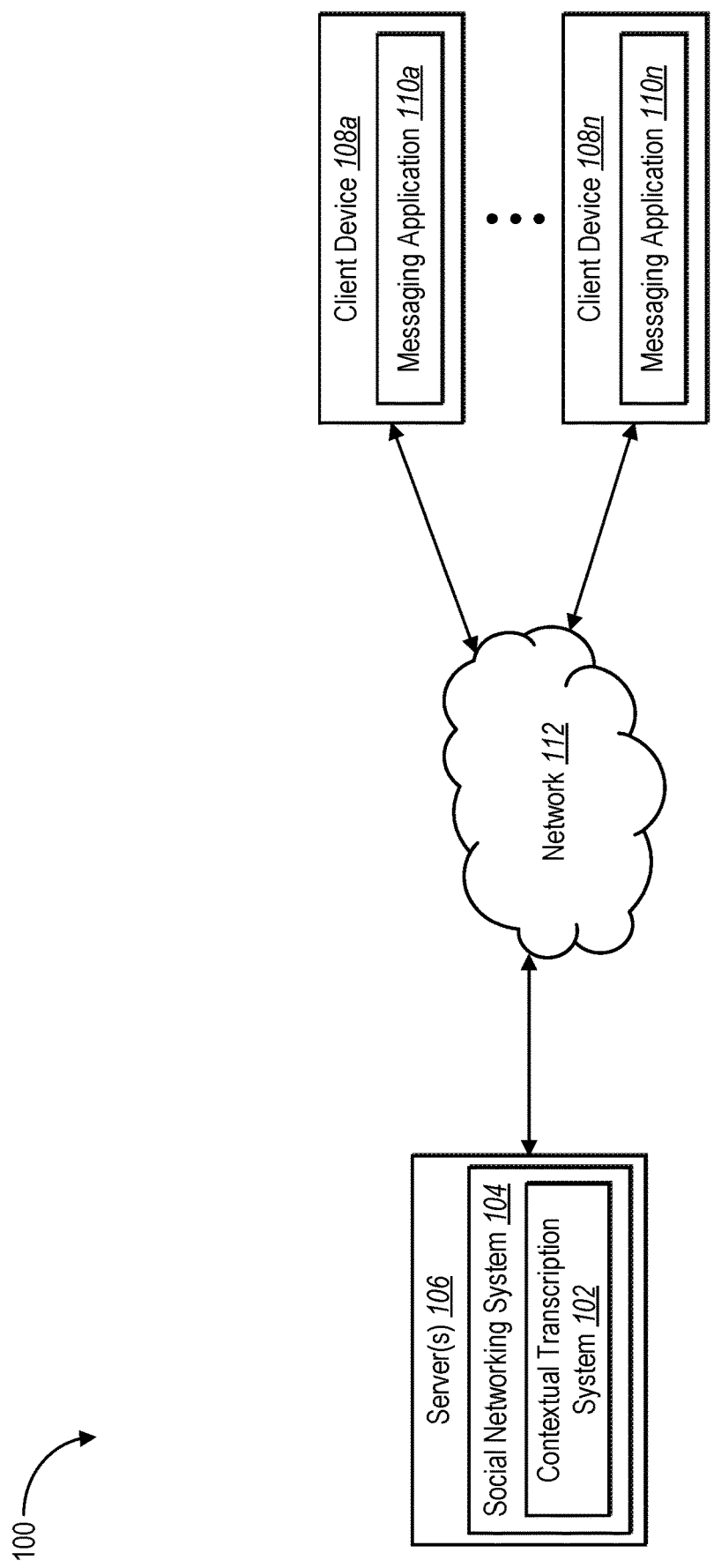
FIG. 1 illustrates a block diagram of an environment in which a contextual transcription system can operate in accordance with one or more embodiments.

This disclosure describes one or more embodiments of a contextual transcription system that generates a transcript of a voice recording within a message thread using contextual data from a social networking system. In some instances, the contextual transcription system receives and analyzes acoustic features of a voice recording corresponding to a message thread between a user and co-user(s). The contextual transcription system can initially generate transcription-text probabilities for terms (or term units) based on the acoustic features of the voice recording. The contextual transcription system can further access social networking data corresponding to the user to extract contextual data relevant to the user and the message thread from the social networking system. Based on the social networking data, the contextual transcription system can determine term weights for terms (or term units) corresponding to objects connected with the user within the social networking system. The contextual transcription system can further adjust the initial transcription-text probabilities using the term weights and generate a transcript of the voice recording.

To illustrate, the contextual transcription system can receive a voice recording and a message-thread identifier corresponding to a message thread between (or among) the user and one or more co-users. Based on acoustic features of the voice recording, the contextual transcription system can generate transcription-text probabilities for transcribing the voice recording from the user. The contextual transcription system further determines weights for terms corresponding to objects associated with the user within a social networking system and adjusts the transcription-text probabilities based on the term weights. Based on the adjusted transcription-text probabilities, the contextual transcription system can generate, for display within the message thread, a transcript of the voice recording.

In at least one embodiment, the contextual transcription system utilizes an automatic-speech-recognition model to generate transcription-text probabilities. In some cases, for instance, the automatic-speech-recognition model comprises an acoustic model, a pronunciation model, and a language model to generate transcription-text probabilities based on acoustic features of the voice recording. The various models can map a sequence of sound units (e.g., phonemes) to generate predicted words and word sequences. Based on the mapping, the contextual transcription system can predict such transcription-text probabilities that the voice recording includes certain words and word sequences.

As suggested above, the contextual transcription system can further utilize a contextual transcription model to identify context for messages in a message thread from social networking data. For instance, the contextual transcription model can analyze social networking data from the social networking system to identify context for a voice message relevant to the user and the message thread. In some cases, the contextual transcription system analyzes social networking data to generate term weights. In at least one embodiment, the contextual transcription system identifies terms corresponding to social-networking objects associated with one or both of the user and co-user(s) participating (or included) in the message thread. The contextual transcription system can accordingly assign a term weight to a term (or term units) based on a particular object type of the social networking object.

When determining term weights, the contextual transcription system may determine (i) a greater weight for terms within a user's social networking profile (e.g., profile information, profile interests) and (ii) a lesser weight for terms in other contexts (e.g., a comment). Accordingly, in some cases, the contextual transcription system determines a priority weight for a term based on the particular object type for a social networking object associated with the term.

Additionally, or alternatively, the contextual transcription system can analyze the frequency with which the user interacts with a social networking object to determine a term weight for a term corresponding to the social networking object. For instance, the contextual transcription system might determine (i) a greater weight for terms related to social networking objects (e.g., an organization, a specific interest group, profile page) with which the user frequently interacts (e.g., by comments, posts, likes, or mentions) and (ii) a lesser weight for terms related to social networking objects with which the user infrequently interacts. Accordingly, in some cases, the contextual transcription system determines a frequency weight for a term based on a frequency with which a user interacts with a corresponding social networking object or mentions the term within the social networking system (e.g., in comments or posts).

After initially determining term weights for terms associated with a user, the contextual transcription system can adjust the term weights. For instance, in some embodiments, the contextual transcription system adjusts a term weight for a term corresponding to a social networking object based on a change associating (or disassociating) the term with the social networking object, a passage of time, or an increase or decrease in frequency with which the user interacts with the social networking object. The contextual transcription system can dynamically customize term weights for a user by message thread or as changes in the social networking system occur or as time passes.

As also noted above, the contextual transcription system can utilize the contextual transcription model to provide context for terms spoken in the voice recording and adjust initial transcription-text probabilities based on such context. In particular, the contextual transcription model can adjust initially determined transcription-text probabilities based on the term weights for terms corresponding to social networking objects. In the alternative to adjusting initial transcription-text probabilities, the contextual transcription system determines transcription-text probabilities in the first instance based in part on such term weights. In at least one embodiment, the contextual transcription system can override the predicted transcription-text probabilities based on such term weights or a term corresponding to a particular object type (e.g., profile name, profile location).

Based on the adjusted transcription-text probabilities, the contextual transcription system can generate a transcript of the voice recording. For instance, in some embodiments, the contextual transcription system identifies a term (or term unit) corresponding to a term weight based in part on a particular object type for a social networking object (e.g., an object type for a comment or profile information). By selecting the term (or the term unit) corresponding to the term weight-based on the particular object type—the contextual transcription system can include the term (or the term unit) in the transcript of the voice recording rather than an alternative term (or an alternative term unit) indicated by unadjusted (or initial) transcription-text probabilities.

As explained above, the contextual transcription system can provide numerous advantages, benefits, and practical applications relative to conventional systems. For instance, in certain implementations, the contextual transcription system improves the accuracy of a voice-recording transcription relative to conventional digital messaging systems and conventional automatic-speech-recognition systems. By adjusting transcription-text probabilities from an automatic-speech-recognition model, the contextual transcription system can generate more accurate transcripts reflecting terms used in the context of the social networking system, even from voice recordings with poor audio quality or recording clarity. Rather than simply analyzing acoustic characteristics of a voice recording to generate a transcript, the contextual transcription system can better weight and select terms for transcription from contextual information of a social network to improve the accuracy of a voice-recording transcripts.

In addition to improved transcription accuracy, the contextual transcription system can improve the accuracy of textual representation of terms spoken by a user relative to conventional digital messaging systems and conventional automatic-speech-recognition systems. By analyzing social networking data specific to one or more of the user or co-users participating (or included) in a message thread, the contextual transcription system can identify specific terms that are likely spoken by the user. For example, the contextual transcription system can reduce spelling, capitalization, and spacing errors of proper nouns (e.g., co-user names, location names, entity names) by more heavily weighting terms that appear on the user's profile or that are associated with objects linked to the user on the social networking system. Similarly, the contextual transcription system can reduce spelling, capitalization, and spacing errors of terms by more heavily weighting terms more frequently mentioned in the social networking system (e.g., provincial terms, slang) or associated with a social networking object with which the user frequently interacts (e.g., an organization).

Independent of improved textual representation, the contextual transcription system can also improve efficiency relative to conventional systems. By increasing the accuracy of transcriptions, the contextual transcription system can often reduce the amount of computing and storage resources that some conventional digital messaging systems or automatic-speech-recognition systems use to correct faulty transcriptions. Because the contextual transcription system utilizes a contextual transcription model that generates term weights specific to one or both of the user and the message thread, the contextual transcription system can correct faulty or inaccurate transcriptions by adjusting transcription-text probabilities. Such corrections can obviate or reduce computing devices used for quality control or correction of initial transcripts from a conventional digital messaging system or an automatic-speech-recognition system.

As illustrated by the foregoing discussion, the present disclosure utilizes a variety of terms to describe features and advantages of the contextual transcription system. As used herein, the term "social networking system" (or "social network") refers to a system that supports and enables online communication, input, interaction, content-sharing, and collaboration between users. The social networking system can store and display information about various users and entities. For example, the social networking system can store and display contact information, personal information, interests, and other data relating to specific users. Additionally, the social networking system can connect a user to other users and entities. For example, the social networking system connect a user with "friends" and entities including employers, educational institutions, interest groups, and others. Furthermore, the social networking system can support messaging between a user and other users, groups, and entities.

As used herein, a "user" or "co-user" of the social networking system refers to any user or entity having access to digital content shared via the social networking system. A user or co-user also refers to a person having the capability to share digital content with other users of the social networking system. For example, a user or a co-user can refer to any entity having an account and/or profile registered with the social networking system. More specifically, a user and a co-users can refer to members of a message thread.

As used herein, the term "message thread" refers to a collection or grouping of digital messages or other digital content exchanged between (or among) two or more users. In some cases, the term message thread includes a virtual space or repository in which a social networking system stores and relays digital messages or other digital content shared by selected users. For example, in one or more embodiments, the social networking system creates a message thread based on a request by a user of the social networking system to share a digital message with one or more co-users of the social networking system. To illustrate, a message thread can include a chat room, instant-messaging forum, social-networking-group space, or ephemeral messaging forum. In one or more embodiments, the social networking system provides a user and one or more co-users access to a display of a message thread.

As further used herein, the term "message-thread identifier" refers to a digital indicator or code identifying a particular message thread. A message thread can include an alphanumeric representation, credentials, a code, a number, a vector, a tag, or other indicator by which a social networking system can identify a specific message thread between or among a user and co-users. For example, the message-thread identifier can include the name of a message thread, an identification number, a series of characters and numbers, or other identifying data unique to the message thread.

As also used herein, the term "transcription-text probability" refers to a probability that a sound or an utterance corresponds to a particular term, term unit, sequence of terms, word, sequence or words, or other text. In some cases, a transcription-text probability includes a probability that a sound or an utterance from a voice recording (or voice message) corresponds to terms and/or term sequences. For example, the contextual transcription system can predict various terms and term sequences within a voice recording. The contextual transcription system can associate probabilities with the terms and term sequences to generate transcription-text probabilities. For instance, the contextual transcription system can determine a percent value indicating a likelihood that a voice recording includes a particular term or term sequence.

As used herein, the term "voice recording" refers to a digital record of audio or sound including a speaker's voice. In some cases, a voice recording includes a digital sound clip formatted in an audio file comprising an audio representation of speech from a user. Such an audio file may come in various suitable formats, including, but not limited to, FLAC, MPEG-4, MPEG-3, OGG, WAV, WMA. As noted above, the contextual transcription system can generate transcripts reflecting the content of the voice recordings. A user may use a computing device to record a message as a voice recording for transcription within a message thread in text-message form.

Relatedly, as used herein, the term "acoustic features" refers to sound components present in or detected from a speech sound capable of being recorded. In some cases, acoustic features include acoustic properties of a voice recording. For example, acoustic features can include physical characteristics of speech sounds including, but not limited to, color, loudness, amplitude, and frequency.

As also used herein, the term "term weight" refers to a coefficient, numeric value, or other weight indicating an affinity, importance, or relevance of a term or a term sequence. In some cases, a term weight indicates a contextual relevance of a term or a term sequence to a user based on social networking data. For example, the contextual transcription system can apply different term weights to terms based on term associations with social networking objects associated with a user.

Relatedly, as used herein, the term "object" or "social networking object" refers to an item represented within a social network. An object or a social networking object includes a digital item represented by a node within a social graph of a social networking system. For example, an object can include a user post to a user profile, a group, or another user as represented by a node within a social graph. An object may likewise be a location or person represented by a node within a social graph. Additionally, an object can include an interest, group, event, and others digital items with which a user interacts (e.g., by likes, joins, comments, attends). Furthermore, an object can refer to an item or node connected to a particular user node for a particular user corresponding to user-input information, including, but not limited to, the user's hometown, interests, topics of user comments, etc. As discussed below, FIG. 12 includes examples of nodes representing social networking objects.

As further used herein, the term "text transcript" or "transcript" refers to a written representation of transcribed speech or other vocal sounds. In some cases, a transcript refers to a written text corresponding to speech represented within a digital voice recording. For example, the contextual transcription system can generate a transcript of a voice recording and provide the transcript as a text message within a message thread.

Turning now to FIG. 1, this figure illustrates a schematic diagram of one embodiment of an environment 100 in which a contextual transcription system 102 can operate. As illustrated, the environment 100 includes one or more server(s) 106 connected to a plurality of client devices 108*a*-108*n* via a network 112 (examples of which will be described below with respect to FIG. 10).

As suggested by FIG. 1, the server(s) 106 may generate, store, receive, and transmit a variety of types of data, including media items, user connections, and messages. For example, the server(s) 106 may receive data from a client device, such as the client device 108*a* and send the data to another client device, such as the client device 108*n*. The server(s) 106 can also transmit electronic messages between one or more users of the environment 100. In one embodiment, the server(s) 106 is a data server. The server(s) 106 can also comprise a communication server or a web-hosting server. This disclosure provides additional details and examples regarding the server(s) 106 with respect to FIG. 8.

In one or more embodiments, the server(s) 106 can include or implement all or a portion of a social networking system 104 and/or the contextual transcription system 102. The social networking system 104 can comprise a social networking system or a digital communications networking system. This disclosure provides additional detail and examples regarding the social networking system 104 below (e.g., in relation to FIGS. 11-12).

As further shown in FIG. 1, the social networking system 104 and/or the contextual transcription system 102 can comprise application(s) running on the server(s) 106 or a portion can be downloaded from the server(s) 106. For example, the contextual transcription system 102 can include a web hosting application that allows the client devices 108*a*-108*n* to interact with content hosted at the server(s) 106. To illustrate, in one or more embodiments, the client devices 108*a*-108*n* can access a webpage supported by the server(s) 106. In particular, the client device 108*a* can run a web page application (e.g., a web browser) to allow a user to access, view, and/or interact with a webpage or website hosted at the server(s) 106.

In one or more embodiments, the social networking system 104 and/or the contextual transcription system 102 can communicate with other social networking systems via the network 112. For example, the contextual transcription system 102 can interact with social network data stored within other social networking systems. In at least one embodiment, the other social networking systems are located on independent servers that are connected to the network 112. More specifically, the contextual transcription system 102 can send to the other social networking systems requests for social network data for a user and connected co-users. For example, the contextual transcription system 102 can receive from the other social networking systems objects and other social networking data from the other social networking systems.

As mentioned above, in one or more embodiments, the client devices 108*a*-108*n* store and transmit digital media and digital messages. The contextual transcription system 102 can utilize the server(s) 106 and the client devices 108*a*-108*n* to distribute selected digital media items and/or digital messages to co-users via the social networking system 104. For example, the contextual transcription system 102 can utilize the server(s) 106 to add client devices associated with users to message threads. The client device 108*a* can transmit digital media items and/or digital messages to the server(s) 106 for distribution to the client devices 108*a*-108*n* accessing a particular message thread. More particularly, the client device 108*a* may send a voice recording for transcription to the server(s) 106.

As further illustrated in FIG. 1, the client devices 108*a*-108*n* include messaging applications 110*a*-110*n*, respectively. The client devices 108*a*-108*n* may interact with the server(s) 106 via the messaging applications 110*a*-110*n*. In particular, the client devices 108*a*-108*n* can access, view, and/or interact with messaging services provided by the server(s) 106. For example, the client device 108*a* can transmit digital messages to the server(s) 106 for distribution to the client devices 108*a*-108*n* via the messaging applications 110*a*-110*n*. Additionally, the client device 108 can receive digital messages from the server(s) 106 via the messaging application 110*a*. Furthermore, the client devices 108*a*-108*n* may transmit voice recordings for transcription to the server(s) 106 and receive transcripts as a digital message within a message thread via the messaging applications 110*a*-110*n*.

The messaging applications 110*a*-110*n* access various functionalities of the client devices 108*a*-108*n*. In some embodiments, the messaging applications 110*a*-110*n* can access cameras, microphones, touchscreen sensors, and others. More specifically, the messaging application 110*a*-110*n* may access the microphone to create a voice recording. The messaging applications 110*a*-110*n* may likewise cause the client devices 108*a*-108*n* to respectively (i) send the voice recordings to the social networking system 104 and/or the contextual transcription system 102 via the server(s) 106 and (ii) receive transcripts of voice recordings from the social networking system 104 and/or the contextual transcription system 102 via the server(s) 106.

Although FIG. 1 illustrates a particular arrangement of the client devices 108*a*-108*n*, the network 112, and the server(s) 106, various additional arrangements are possible. For example, the client devices 108*a*-108*n* may directly communicate with the server(s) 106, bypassing the network 112. Alternatively, the client devices 108*a*-108*n* may communicate directly with each other.

Similarly, although the environment 100 of FIG. 1 is depicted as having various components, the environment 100 may have additional or alternative components. For example, the environment 100 can be implemented on a single computing device within the social networking system 104 and/or the contextual transcription system 102. In particular, the social networking system 104 and/or the contextual transcription system 102 may be implemented in whole or in part on a client device of the client devices 108a-108n.

As just described, the contextual transcription system 102 may be implemented in whole, or in part, by the server(s) 106 or the client devices 108a-108n of the environment 100. It will be appreciated that although certain components or functions of the contextual transcription system 102 are described in the previous example with regard to particular elements of the environment 100, various alternative implementations are possible. For instance, in one or more embodiments, the contextual transcription system 102 is implemented on one of the client devices 108a-108n. Similarly, in one or more embodiments, the contextual transcription system 102 may be implemented separately among the client devices 108a-108n, the server(s) 106, and the network 112.

Figure 2:
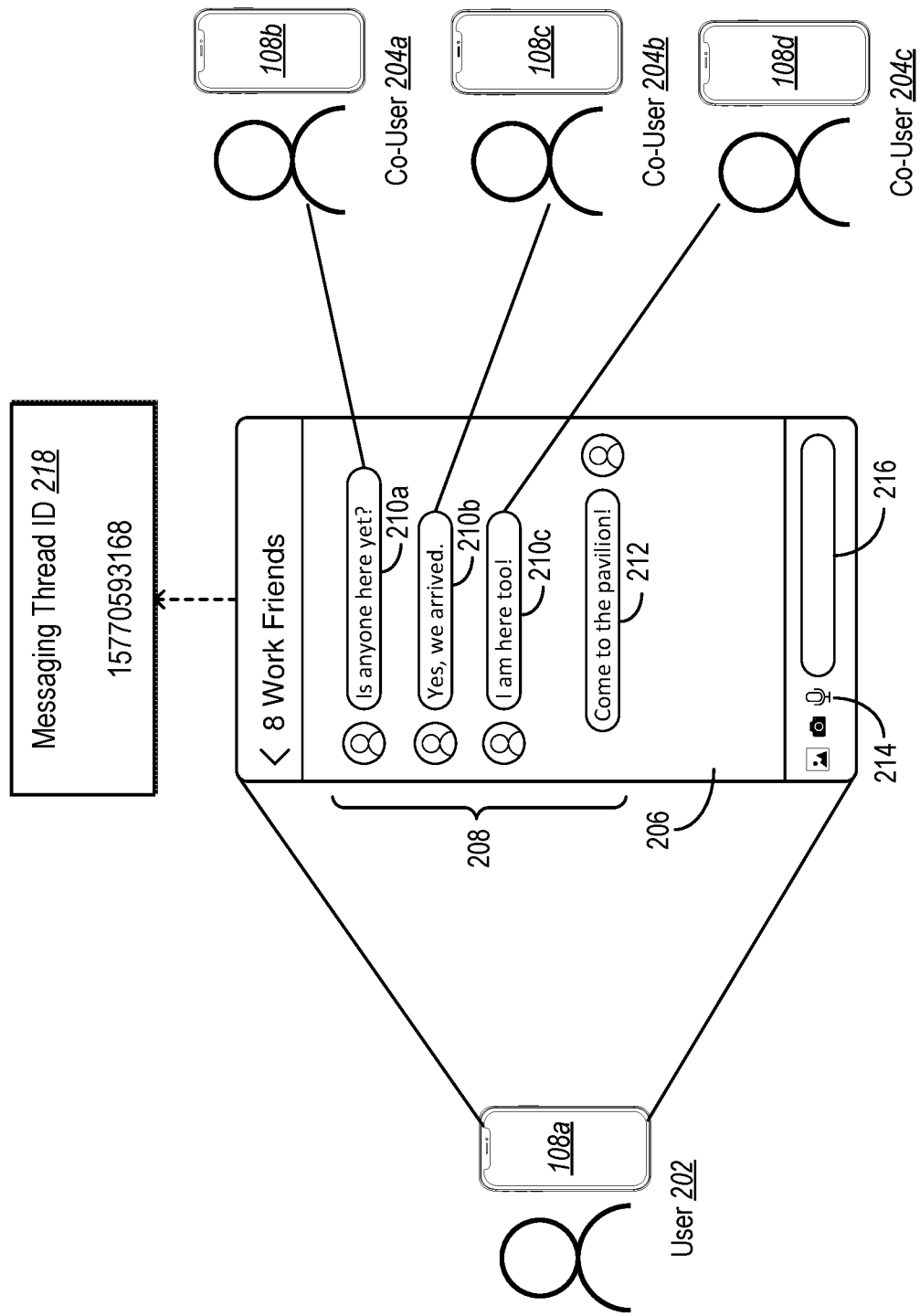
FIG. 2 illustrates providing a message thread to users of a social networking system in accordance with one or more embodiments.

As mentioned previously, the social networking system 104 can host message threads between a user and one or more co-users. FIG. 2 illustrates an example of a message-thread-graphical-user interface 206 displayed on the client device 108a associated with a user 202. The client device 108a presents a message thread 208 comprising co-user messages 210a-210c and a user message 212 within the message-thread-graphical-user interface 206. Client devices 108b-108d associated with co-users 204a-204c send the co-user messages 210a-210c, and the client device 108a associated with the user 202 sends the user message 212. The message-thread-graphical-user interface 206 also includes an audio-capture element 214 and a text-input element 216. The message thread 208 is associated with a message-thread identifier 218.

The social networking system 104 can create message threads to collect digital content shared between the user 202 and one or more co-users. For example, the client device 108a presents the message thread 208 as an instant messaging forum including messages sent by the user 202 and the co-users 204a-204c. In at least one embodiment, the user 202 and the co-users 204a-204c are users of the social networking system 104. For instance, the user 202 and the co-users 204a-204c are associated with user profiles on the social networking system 104.

Although FIG. 2 illustrates a visual representation of the message thread 208 comprising text messages, the social networking system 104 can share messages comprising various types of digital content. For example, in one or more embodiments, the social networking system 104 receives and sends image messages, video messages, audio messages, ephemeral digital content (e.g., messages that disappear after a predetermined period of time), and other message types.

As noted above, the contextual transcription system 102 can generate text messages from voice recordings. For instance, any of the co-user messages 210a-210c and the user message 212 can be generated by the contextual transcription system 102 based on voice recordings sent by the client devices 108a-108b. Based on user interaction with the audio-capture element 214, for example, the client device 108a can record a voice recording of a message from the user 202 and send the voice recording to the contextual transcription system 102. In at least one embodiment, the contextual transcription system 102 transcribes speech within the voice recording in real time (or near real time) and sends a transcript of the voice recording to the client device 108 for display via the text-input element 216. The contextual transcription system 102 can accordingly send the transcript of the voice recording to the client device 108a to display within the message thread 208.

As further shown in FIG. 2, the social networking system 104 associates the message-thread identifier 218 with the message thread 208. When the user 202 requests, via the client device 108a, to begin the message thread 208, the social networking system 104 generates the message-thread identifier 218 for the message thread 208. The social networking system 104 stores the message-thread identifier 218 with data specific to the message thread 208. For example, the social networking system 104 links user identifiers for the user 202 and the co-users 204a-204c, user identifiers for past users involved in the message thread 208, all messages within the message thread 208, and other relevant data with the message-thread identifier 218.

As suggested above, in some embodiments, the contextual transcription system 102 can access social networking data relevant to the user 202 using the message-thread identifier 218—based on receiving a voice recording from the client device 108a. For example, the contextual transcription system 102 uses the message-thread identifier 218 to access social networking data of the user 202. In some embodiments, the contextual transcription system 102 also accesses social networking data of the co-users 204a-204c. Additional detail regarding accessing social networking data will be provided in the discussion accompanying FIG. 5A.

In at least one embodiment, the contextual transcription system 102 uses the message-thread identifier 218 to access previous messages within the message thread 208 to provide context for transcription. In particular, the contextual transcription system 102 analyzes content of past messages within the message thread 208 as part of determining or adjusting term weights. In at least one embodiment, the contextual transcription system 102 accesses content for all messages within the message thread 208. Alternatively, in at least one other embodiment, the contextual transcription system 102 accesses recent messages within a specific time period (e.g., the last two months) as context for transcription. As suggested above and explained further below, in some cases, the contextual transcription system 102 determines a frequency weight for a term based on a frequency with which the user 202 (or the co-users 204a-204c) mention the term within in all such messages or such recent messages within the message thread 208.

Figure 3:
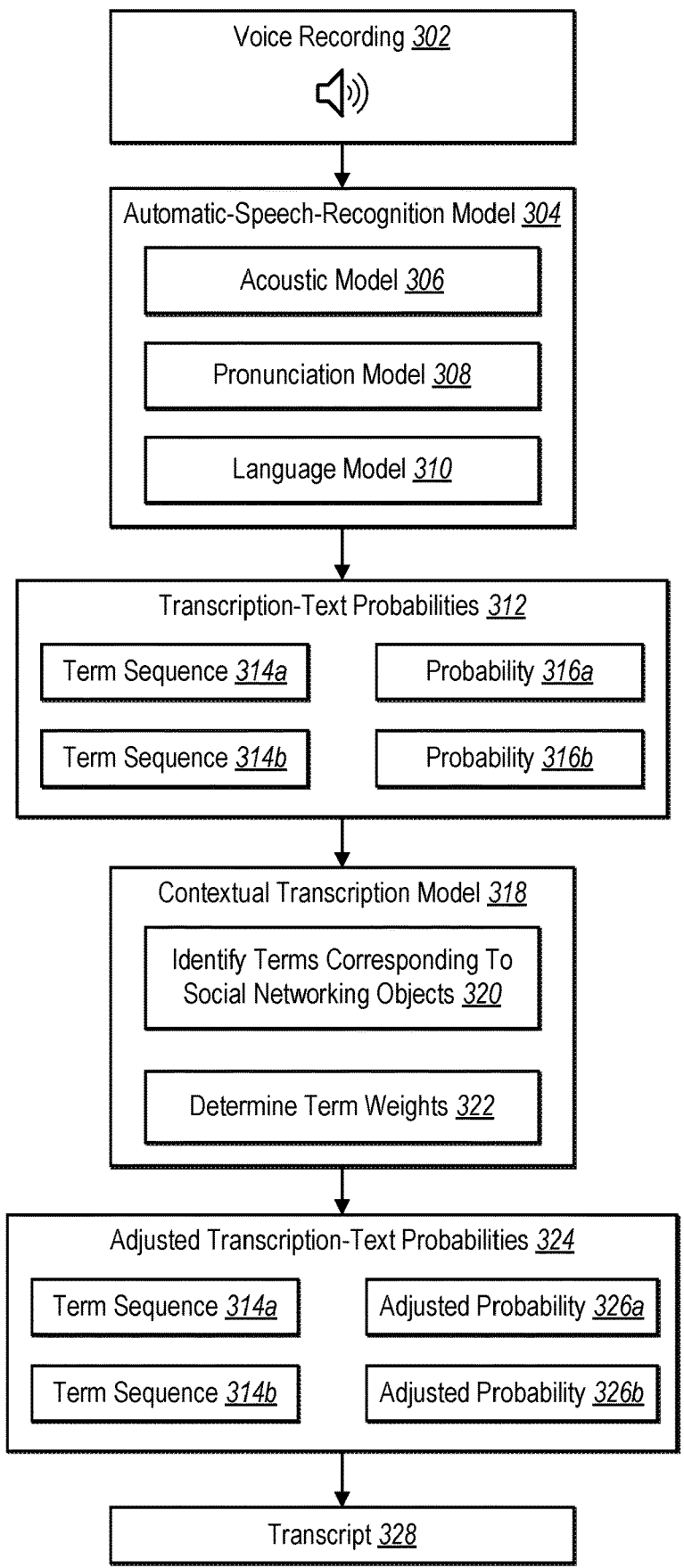
FIG. 3 illustrates generating and displaying a text transcript by a contextual transcription system from a voice recording in accordance with one or more embodiments.

As mentioned above, in some embodiments, the contextual transcription system 102 uses both an automatic-speech-recognition model and a contextual transcription model to generate a transcript of a voice recording. In accordance with one or more embodiments, FIG. 3 illustrates an overview of the contextual transcription system 102 utilizing both such models to generate a context-relevant transcript from a voice recording. As illustrated, the contextual transcription system 102 provides a voice recording 302 from the client device 108a to an automatic-speech-recognition model 304 to generate transcription-text probabilities 312. The contextual transcription system 102 further utilizes a contextual transcription model 318 to adjust the transcription-text probabilities 312 based on social networking data. Based on the adjusted transcription-text probabilities 324, the contextual transcription system 102 generates and displays transcript 328.

As suggested by FIG. 3, the contextual transcription system 102 receives the voice recording 302 from the client device 108a. Generally, the voice recording 302 includes a digital audio file with speech. The client device 108a records and sends the voice recording 302 to the contextual transcription system 102 along with the message-thread identifier 218 corresponding to the message thread 208. For example, the messaging application 110a may include computer-executable instructions that cause the client device 108a to record the voice recording 302 of the user 202 based on detecting selection of an audio-capture element. In at least one embodiment, the voice recording 302 comprises a complete audio recording from beginning to end. By contrast, in at least one other embodiment, the voice recording 302 comprises an audio recording streamed from the client device 108a to the contextual transcription system 102.

After receiving the voice recording 302, the contextual transcription system 102 analyzes acoustic features of the voice recording 302 using the automatic-speech-recognition model 304. As mentioned, the automatic-speech-recognition model 304 analyzes the acoustic features of the voice recording 302 to generate the transcription-text probabilities 312. For example, the automatic-speech-recognition model 304 identifies terms or term sequences and corresponding probabilities that such terms or term sequences represent or correspond to speech within the voice recording 302. As shown in FIG. 3, the automatic-speech-recognition model 304 includes an acoustic model 306, a pronunciation model 308, and a language model 310. The disclosure describes each of the acoustic model 306, the pronunciation model 308, and the language model 310 further below with respect to FIG. 4.

As illustrated in FIG. 3, the contextual transcription system 102 generates the transcription-text probabilities 312 comprising a predicted accuracy of terms or terms sequences based on analysis of the voice recording 302. As shown in FIG. 3, the transcription-text probabilities 312 include probabilities 316a-316b corresponding to term sequences 314a-314b. For example, the automatic-speech-recognition model 304 predicts the probability 316a (e.g., 55%) that a sound or acoustic features from the voice recording 302 includes term sequence 314a (e.g., "write here"). The automatic-speech-recognition model 304 further predicts the probability 316b (e.g., "40%") that the same sound or acoustic features from the voice recording 302 correspond to the term sequence 314b (e.g., "right here").

FIG. 3 depicts the probabilities 316a and 316b as examples. In some cases, the automatic-speech-recognition model 304 generates transcription-text probabilities for every sound or acoustic feature within the voice recording 302. Further, in some embodiments, the automatic-speech-recognition model 304 generates a probability for a term (or probabilities repetitively corresponding to multiple terms) as transcription-text probabilities.

After generating the transcription-text probabilities 312, the contextual transcription system 102 uses the contextual transcription model 318 to adjust the transcription-text probabilities 312 to reflect contextual understanding from social networking data. The contextual transcription system 102 applies the contextual transcription model 318 to social networking data to determine term weights specific to the user 202 and (in some cases) the message thread 208. Such social networking data may include profile information for the user 202 or previous messages within the message thread 208.

As illustrated in FIG. 3, the contextual transcription system 102 utilizes the contextual transcription model 318 to perform act 320 of identifying terms corresponding to social networking objects. For example, the contextual transcription model 318 identifies social networking objects connected (directly or indirectly) to the user 202 and terms associated with those social networking objects. Having identified such social networking objects, the contextual transcription system 102 further performs act 322 of determining term weights. In some cases, the contextual transcription system 102 determines (i) a greater weight for terms corresponding to nodes representing profile information for the user 202 (e.g., name, location) or term used in previous comments within the message thread 208 and (ii) a lesser weight for terms corresponding to nodes representing social networking objects in other contexts (e.g., comments by the user 202 responding to posts of users not participating in the message thread 208). This disclosure describes identifying terms corresponding to social networking objects and determining term weights further below with respect to FIG. 5A.

Based on the term weights from the contextual transcription model 318, the contextual transcription system 102 adjusts the transcription-text probabilities 312 to generate the adjusted transcription-text probabilities 324. For instance, the contextual transcription system 102 adjusts the probabilities 316a-316b for the term sequences 314a-314b based on the term weights by applying a term weight as a coefficient to each of the probabilities 316a-316b (e.g., a multiplication operation). As illustrated in FIG. 3, the contextual transcription system 102 generates an adjusted probability 326a for the term sequence 314a and an adjusted probability 326b for the term sequence 314b. Additionally, or alternatively, the contextual transcription system 102 generates an adjusted probability for a term (or adjusted probabilities respectively corresponding to multiple terms) as part of adjusted transcription-text probabilities. This disclosure describes adjusted transcription-text probabilities further below with respect to FIG. 5B.

As further shown in FIG. 3, the contextual transcription system 102 generates the transcript 328 based on the adjusted transcription-text probabilities 324. For example, the contextual transcription system 102 can generate a transcript comprising term sequences with the highest adjusted probabilities for each sound or acoustic feature in the voice recording 302. The contextual transcription system 102 further provides the transcript 328 to the client device 108a to display within the message thread.

As mentioned above, in some embodiments, the contextual transcription system 102 utilizes the automatic-speech-recognition model 304 to generate the transcription-text probabilities 312 for the voice recording 302. In accordance with one or more embodiments, FIG. 4 illustrates the acoustic model 306 determining phonemes for acoustic features of a voice recording, the pronunciation model 308 determining graphemes corresponding to phonemes, and the language model 310 determining transcription-text probabilities based on such phonemes.

Figure 4:
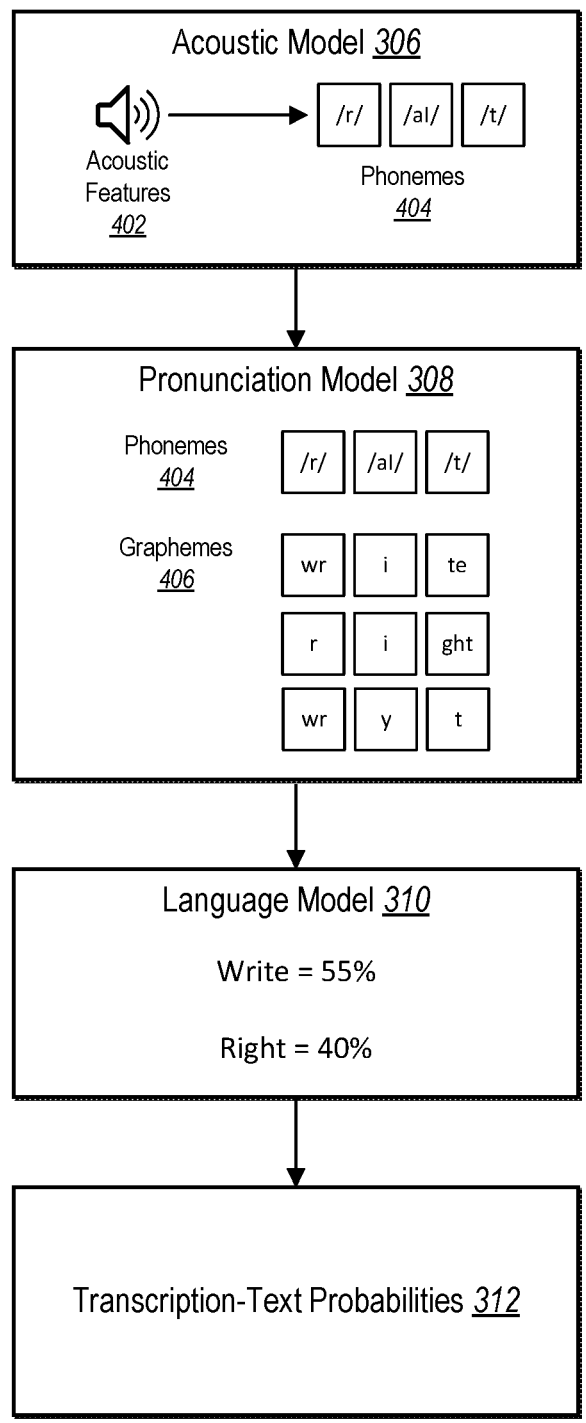
FIG. 4 illustrates generating transcription-text probabilities in accordance with one or more embodiments.

As shown in FIG. 4, the acoustic model 306 models relationships between acoustic features 402 of the voice recording 302 and phonetic units of language (i.e., sound units). For example, the acoustic model 306 analyzes the acoustic features 402 of the voice recording 302 to predict phonemes 404. The acoustic model 306 segments the voice recording 302 into small frames (e.g., 10 milliseconds) and analyzes acoustic features within overlapping frames. Based on the acoustic features 402 of a frame or set of frames within the voice recording 302, for example, the acoustic model 306 predicts the phonemes /r/, /aɪ/, and /t/ as sound units. As depicted in FIG. 4, the phonemes 404 comprise perceptually distinct units of phonetic sounds that correspond to a set of similar speech sounds.

As suggested above, in at least one embodiment, the acoustic model 306 comprises a trained acoustic machine learning model. More specifically, the contextual transcription system 102 trains the acoustic machine learning model using training audio clips and training phonemes. The contextual transcription system 102 uses as input voice recordings as inputs and receives predicted phonemes from the acoustic model as output and compares such predicted phonemes to ground-truth phonemes. Based on a loss determined from a comparison of predicted phonemes and ground-truth phonemes, the contextual transcription system 102 adjusts parameters of the acoustic model 306 to decrease a subsequent loss in a subsequent iteration.

In at least one embodiment, the acoustic model 306 utilizes a clustering algorithm to visually map acoustic features and determine the phonemes 404 based on the clustering. For example, in some cases, the acoustic model 306 maps historical acoustic features within a space (e.g., a Euclidian space). Using a clustering algorithm, the acoustic model 306 identifies clusters of the historical acoustic features. Based on historical data, the acoustic model 306 identifies cluster patterns associated with phonemes or other sound units. When the acoustic model 306 receives the voice recording 302, the acoustic model 306 maps the acoustic features 402 within the space. Based on the clustering algorithm, the acoustic model 306 can group the acoustic features 402 with historical clusters. To predict the phonemes 404, the acoustic model 306 predicts the acoustic features 402 correspond to identified clusters for the phonemes 404. Rather than utilizing a global historical data set (e.g., data from all users of the social networking system 104), in some embodiments, the contextual transcription system 102 utilizes historical data (e.g., historical acoustic features and phonemes) specific to the user 202. Thus, the contextual transcription system 102 improves the accuracy of phoneme prediction within the acoustic model 306 with respect to the user 202.

After determining phonemes, the contextual transcription system 102 utilizes the pronunciation model 308 to map the phonemes 404 to term units (i.e., graphemes). As shown in FIG. 4, the pronunciation model 308 maps the phonemes 404 to the graphemes 406. The graphemes 406 comprise units of a writing system within a language. In at least one embodiment, the pronunciation model 308 comprises a lexicon that maps each phoneme to all potential graphemes. For example, as illustrated in FIG. 4, the pronunciation model 308 predicts the graphemes 406 that may be associated with the phonemes 404. As but on example, the pronunciation model 308 predicts that the graphemes "wr" and "r" are linked to the phoneme /r/. In at least one embodiment, the contextual transcription system 102 generates a number of the graphemes 406 potentially corresponding to the phonemes 404.

Based on graphemes, in some cases, the pronunciation model 308 predicts potential terms (e.g., terms and term sequences) based on the term units. The pronunciation model 308 maps all potential grapheme combinations to terms and term sequences. For example, a series of graphemes can represent one or more terms. The pronunciation model 308 identifies real terms and term-sequence combinations and eliminates nonsensical terms and term sequences. As illustrated, the pronunciation model 308 maps the phonemes 404 to the graphemes 406 that, when combined, create potential terms "write" and "right." The pronunciation model 308 also predicts variations in term sequences. For instance, the pronunciation model determines that the graphemes 406 linked to the phonemes 404 include letters from two or more separate terms instead of one term (e.g., write, right, etc.). In some cases, the pronunciation model 308 predicts that the graphemes 406 include the letters "wr," "y," and "t" that correlate to the term sequence "awry. Time," or a number of various term sequences depending on the preceding and following graphemes.

Based on such terms and term sequences, the language model 310 determines probabilities for possible terms and term sequences within a voice recording. In some cases, the language model 310 comprises a neural network that utilizes term embeddings to make predictions and determine initial transcription-text probabilities. Upon identifying possible terms or term sequences from the pronunciation model 308, the language model 310 distinguishes between terms (or between term sequences) that sound similar. For example, the language model 310 can determine probabilities that a particular term sequence is a correct term sequence at a location in the voice recording 302. As illustrated in FIG. 4, the language model 310 assigns the probability 55% to the term "write," and the probability 40% to the term "right."

In at least one embodiment, the language model 310 determines probabilities of term sequences based on the previous (or subsequent) terms or term sequences within a voice recording. Based on determining that a preceding term sequence likely comprises "I will," for example, the language model 310 assigns a greater probability to "write" than to "right." Based on determining that a subsequent term sequence likely comprises "down on paper," the language model 310 likewise assigns a greater probability to "write" than to "right."

As illustrated in FIG. 4, the acoustic model 306, the pronunciation model 308, and the language model 310 together form the automatic-speech-recognition model 304 to generate the transcription-text probabilities 312. As discussed previously, the transcription-text probabilities 312 comprise the probabilities 316a and 316b corresponding to the term sequences 314a and 314b. As suggested above, transcription-text probabilities may likewise include a collection of probabilities for alternative terms or term sequences.

Figure 5A:
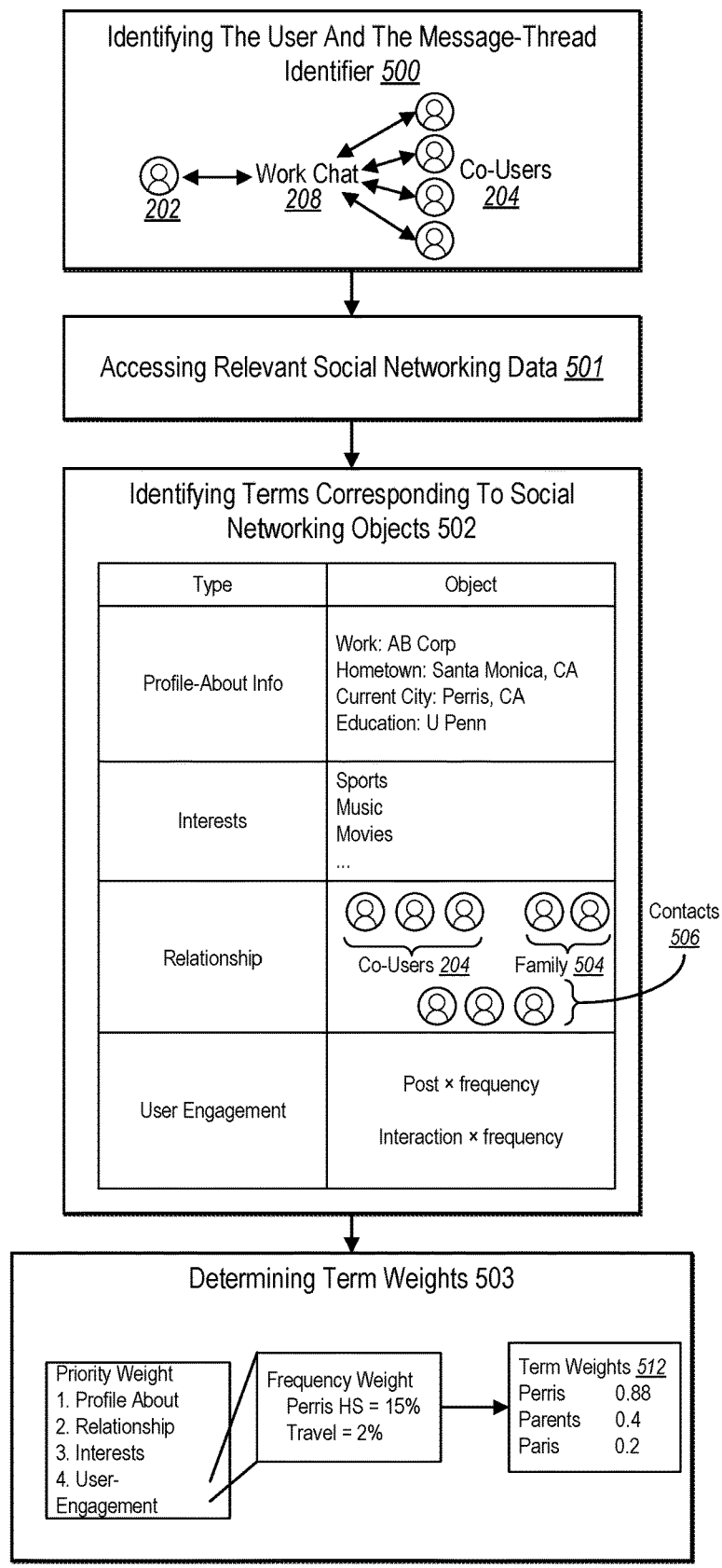
FIGS. 5A-5B illustrate determining term weights and generating a text transcript in accordance with one or more embodiments.
Figure 5B:
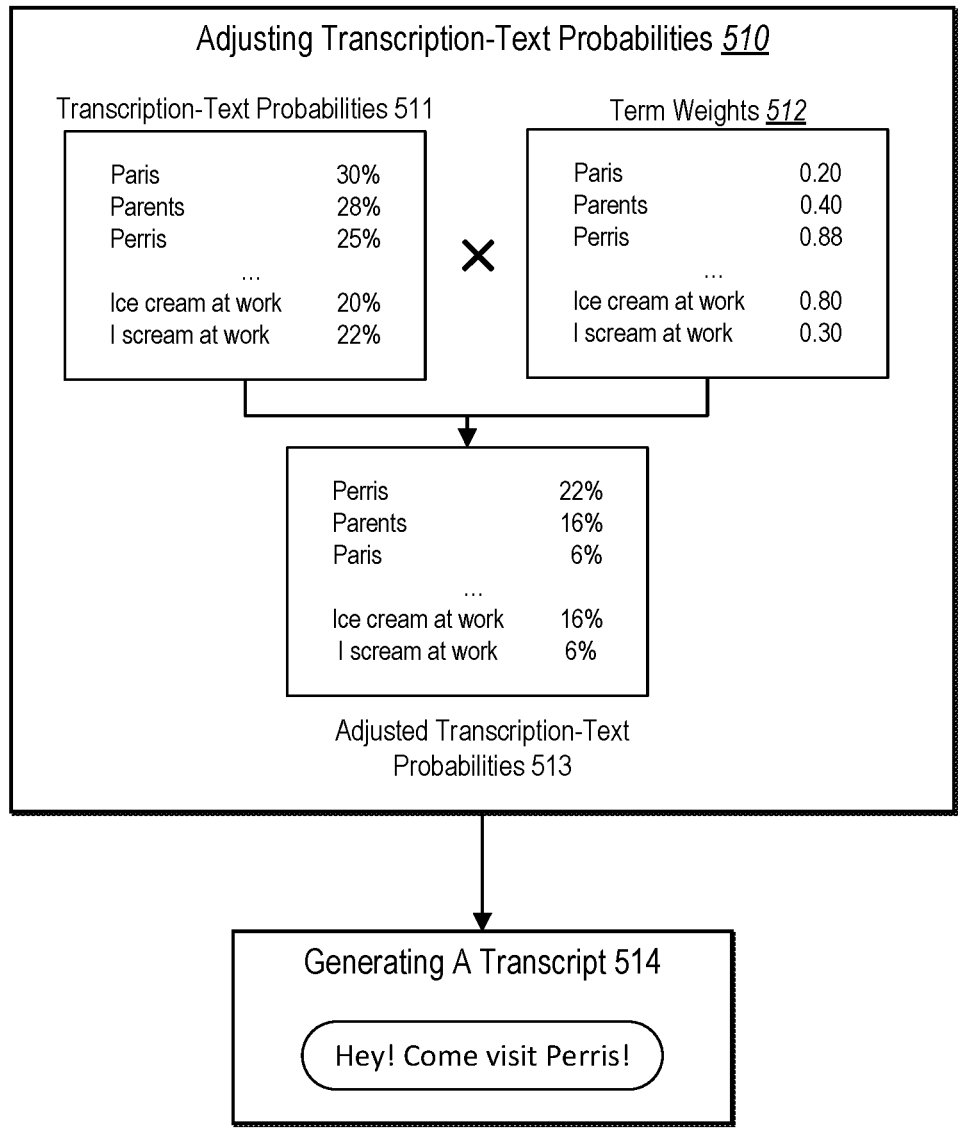

As mentioned previously, in some embodiments, the contextual transcription system 102 utilizes the contextual transcription model 318 to adjust the transcription-text probabilities 312 based on contextual understanding specific to the user 202. In accordance with one or more embodiments, FIGS. 5A-5B illustrate the contextual transcription model 318 utilizing social networking data to adjust such transcription-text probabilities. FIG. 5A illustrates the contextual transcription system 102 determining term weights based identified terms that correspond to social networking objects. FIG. 5B illustrates the contextual transcription system 102 adjusting the transcription-text probabilities and generating a transcript of a voice recording based on the adjusted transcription-text probabilities.

As indicated above, the contextual transcription system 102 assigns term weights to bias transcription towards terms or term sequences that are more contextually relevant to the user 202 for the message thread 208. FIG. 5A illustrates determining term weights that reflect such contextual relevance. As illustrated in FIG. 5A, the contextual transcription system 102 performs an act 500 of identifying the user and the message-thread identifier, an act 501 of accessing social networking data, an act 502 of identifying terms corresponding to social networking objects, and an act 503 of determining term weights. Each of these acts will be described below.

As just indicated, the contextual transcription system 102 performs the act 500 of identifying the user and the message-thread identifier. In this example, the contextual transcription system 102 identifies the user 202 associated with the client device 108*a* that sent the voice recording 302. Furthermore, the contextual transcription system 102 identifies the message-thread identifier 218 unique to the message thread 208. As part of identifying the user 202, the contextual transcription system 102 identifies a social networking account linked to the user 202. In at least one embodiment, the social networking system 104 identifies a social networking account for the user 202 based on log-in credentials. For example, in some cases, the social networking system 104 requires the user 202 to log in to the messaging application 110*a* using the same username and password linked to the user's social networking account. Based on identifying a username and password for the user 202, for example, the social networking system 104 can identify a user node for the user 202 in a social graph corresponding to a social networking account.

Additionally, in some embodiments, the contextual transcription system 102 also identifies social networking accounts linked to the co-users 204*a*-204*c*. For instance, the contextual transcription system 102 accesses the message-thread identifier 218 for the message thread 208 to identify the participating co-users 204*a*-204*c*. Based on identifying the co-users 204*a*-204*c*, the contextual transcription system 102 can also access social networking data linked to the co-users 204*a*-204*c*.

As further shown in FIG. 5A, the contextual transcription system 102 performs the act 501 of accessing relevant social networking data. In particular, the contextual transcription system 102 accesses social networking data linked to the user 202. In at least one embodiment, the contextual transcription system 102 accesses public social networking data of the social networking account of the user 202. Such public social networking data may include nodes within a social graph corresponding to publicly available profile information, publicly available posts, or publicly available comments. In at least one other embodiment, the contextual transcription system 102 also accesses private data of the social networking account for the user 202 (e.g., based on privacy settings selected by the user 202). Such private social networking data may include nodes within a social graph corresponding to private profile information, private posts, or private comments (e.g., accessible to friends or contacts or the user 202 or accessible to the user 202 only). In at least one embodiment, the contextual transcription system 102 performs similar steps to access public and/or private social networking data linked to the co-users 204*a*-204*c*.

As part of the act 501 of accessing relevant social networking data, in some embodiments, the contextual transcription system 102 accesses historical message data for the message thread 208. In particular, the contextual transcription system 102 utilizes the message-thread identifier 218 to identify a node within a social graph corresponding to the message thread 208 and access previous digital messages sent within the message thread 208. For example, the contextual transcription system 102 can analyze previous messages to identify terms for common topics and themes. In at least one embodiment, the contextual transcription system 102 accesses recently sent messages sent within a predetermined time period (e.g., sent within the last two months, year, two years, etc.). In at least one other embodiment, the contextual transcription system 102 accesses all previous messages within the message thread 208.

As further illustrated in FIG. 5A, the contextual transcription system 102 performs the act 502 of identifying terms corresponding to social networking objects. As noted above, the contextual transcription system 102 analyzes objects associated with the user 202 within the social network system 104. For example, in some cases, the contextual transcription system 102 analyzes nodes within a social graph connected either directly or indirectly by edges to a user node for the user 202. As suggested above, the contextual transcription system 102 can identify nodes corresponding to profile information, posts, or comments connected to a user node for the user 202. The contextual transcription system 102 identifies terms corresponding to those objects.

In some cases, terms associated with objects include specific terms that directly represent the objects within the social networking system 104, such as a term corresponding to a node within a social graph. For example, a user node for the user 202 might be connected to various nodes for Australian shepherding based on the user 202 joining a social networking group dedicated to Australian shepherds, listing Australian shepherds as an interest, or by creating posts discussing Australian shepherds. The contextual transcription system 102 can identify the term "Australian shepherd" as corresponding to a social networking object for Australian shepherd (e.g., a node for Australian shepherding).

In at least one embodiment, the contextual transcription system 102 identifies additional terms related to a social networking object. The contextual transcription system 102 can identify related terms based on common occurrence. For instance, in one or more embodiments, the contextual transcription system 102 identifies the terms "dog," "puppy," "herding," and others based on determining that those related terms frequently appear within the context of a social networking object for Australian shepherding.

Additionally, in some cases, the contextual transcription system 102 can identify terms corresponding to social networking objects by generating word embeddings. For instance, in some cases, the contextual transcription system 102 generates a word embedding (e.g., using a word2vec algorithm) for the term representing the social networking object and searches for related words using the cosine similarity of word vectors. The contextual transcription system 102 identifies related words that meet a similarity threshold. Furthermore, the contextual transcription system identifies terms corresponding to social networking objects by identifying trending terms related to the social networking object. For instance, for a social networking object that comprises an interest group (e.g., an Australian shepherd owners social networking group), the contextual transcription system 102 identifies the most popular terms used within a given period of time.

As suggested above, the contextual transcription system 102 can analyze different types of social networking objects, including, but not limited to, profile-about information, profile interests, friends, user engagement, and others. These various social networking object types (or simply "object type") will be discussed below. As illustrated in FIG. 5A, the contextual transcription system 102 analyzes social networking objects from profile information about the user (e.g., "profile-about information") posted to a social networking account corresponding to the user 202. About-profile information comprises personal information entered by the user 202 into the social networking system 104. As illustrated, profile-about information includes objects identifying employers, locations (e.g., hometown, current city, previous places of residence, etc.), educational institutions (e.g., elementary school, high school, university, etc.), relationship status, life events, contact information, and other information relevant to the user 202.

In some cases, the contextual transcription system 102 also identifies terms corresponding to interest-type social networking objects. Interests within the social networking system 104 can comprise interests both indicated by the user 202 and also interests predicted by the social networking system 104. For instance, the user 202 may opt to join social networking interest groups or input interests for display within a social networking profile. The social networking system 104 may also identify interests linked to the user 202 based on past indicated interests or expressed interest (e.g., from comments or posts).

As part of act 502 of identifying terms corresponding to social networking objects, the contextual transcription system 102 identifies terms corresponding to relationship-type social networking objects. Relationship-type social networking objects comprise relationships between the user 202 and other connected users within the social networking system 104. In particular, the contextual transcription system 102 accesses social networking data to identify listed relationships including family members, close friends, friends, and other contacts. For instance, the contextual transcription system 102 identifies, as terms, names of the co-users 204a-204c, names of family members 504, and names of contacts 506 (i.e., all other connected users).

The contextual transcription system 102 also identifies terms corresponding to user-engagement-type social networking objects. User-engagement-type social networking objects comprise logged user actions of the user 202 within the social networking system 104, such as nodes within a social graph representing or related to user actions. User-engagement-type social networking objects can include nodes for posts created by the user 202 and nodes for user interactions with posts (e.g., likes, comments, etc.). For instance, in some cases, the contextual transcription system 102 identifies terms within posts created by the user 202 and terms within posts with which the user 202 has interacted (e.g., liked or responded with another reaction, commented, or shared). In some embodiments, the contextual transcription system 102 determines the frequency of identified terms within the posts and also the frequency of terms within the posts receiving interaction from the user 202.

Additionally, in some implementations, the contextual transcription system 102 identifies terms corresponding to social networking objects based on a subset of users. The contextual transcription system 102 identifies a subset of users that share or are connected to a common social networking object. The contextual transcription system 102 identifies terms or term sequences frequently used by users of the subset of users. For instance, the contextual transcription system 102 determines that users that list a common hometown frequently use a set of terms (e.g., slang). Additionally, the contextual transcription system 102 can identify a unique set of terms that is currently trending within a subset of users that is linked a certain social networking object.

Though not illustrated, in some embodiments, the contextual transcription system 102 also identifies terms within previous messages within the message thread 208 or other message threads corresponding to the user 202. For instance, the contextual transcription system 102 can identify trending or common terms within previous messages of the message thread 208. The contextual transcription system 102 can also identify topics within the previous messages and terms correlating with the topics. In at least one embodiment, the contextual transcription system 102 extracts topics from the previous messages. For example, in certain implementations, the contextual transcription system 102 can utilize Latent Dirichlet Allocation to identify topics. Regardless of the topic-identification method, in some implementations, the contextual transcription system 102 determines terms corresponding to the identified topics. As mentioned, the contextual transcription system 102 identifies terms within all previous messages or terms in messages sent within a determined time period.

As further illustrated in FIG. 5A, the contextual transcription system 102 performs act 503 of determining term weights. As suggested above, the contextual transcription system 102 assigns term weights 512 to the terms identified in the act 503. In at least one embodiment, the contextual transcription system 102 assigns priority weights to terms based on a ranked list of social networking object types. For example, the contextual transcription system 102 assigns greater priority weights to identified terms corresponding to higher ranked social networking objects. As illustrated in FIG. 5A, for instance, the contextual transcription system 102 prioritizes the following object types: 1. About Profile, 2. Relationships, 3. Interests, and 4. User Engagement. Thus, the contextual transcription system 102 assigns greater priority weights to terms identified based on profile-type social networking objects than terms identified based on interest-type social networking objects.

As suggested above, the contextual transcription system 102 can determine a term weight for terms identified based on a particular object type corresponding to a social networking object. As shown in FIG. 5A, for instance, the contextual transcription system 102 determines (i) a term weight of 0.88 to identified terms corresponding to profile-type social networking objects and (ii) a lower term weight (e.g., 0.2) for terms corresponding to user-engagement-type social networking objects. If the identified term corresponds to more than one type of social networking object, in some cases, the contextual transcription system 102 can base a term weight on a ranking of object type or adjust a term weight based on a combination of object types. For example, in some cases, the contextual transcription system 102 selects a highest ranked object type corresponding to a term as a basis for determining a term weight for the term. Alternatively, in some embodiments, the contextual transcription system 102 adds or averages the term weights corresponding to multiple object types corresponding to a term to determine a cumulative term weight for the term.

FIG. 5A illustrates but one example of a ranking list for assigning priority weights. In some embodiments, the contextual transcription system 102 can also generate different rank lists. For example, the contextual transcription system 102 can generate different ranking lists in which the social networking object types are linked to different rankings.

In addition to ranking object types, in some cases, the contextual transcription system 102 ranks social networking object subtypes within the social networking object types. Within the relationship-type social networking objects, the contextual transcription system 102 determines different weights for different relationship sub-types. For example, in certain implementations, the contextual transcription system 102 assigns greater term weights to terms (e.g., names) corresponding to family relationships and lesser term weights to terms corresponding to general contact relationships (e.g., friends). Within the interest-type social networking objects, the contextual transcription system 102 can determine different weights for interest sub-types based on how the social networking system 104 determined the interest. For example, in some cases, the contextual transcription system 102 assigns greater term weights to terms corresponding to interests input by the user 202 as part of profile information and lesser term weights to terms corresponding to interests inferred by the social networking system 104.

In addition (or in the alternative to) priority weights, in certain implementations, the contextual transcription system 102 determines frequency weights for terms corresponding to user-engagement-type social networking objects. In some cases, the contextual transcription system 102 determines greater frequency weights for terms that frequently appear in user-engagement-type social networking objects (e.g., comments or liked posts/comments). For example, the contextual transcription system 102 can count the number of user-engagement-type social networking objects corresponding with each term and adjust the term weights based on the number count.

In at least one embodiment, and as illustrated in FIG. 5A, the contextual transcription system 102 determines a percentage of overall user engagement and determines term weights accordingly. For example, the contextual transcription system 102 determines that 15% of all of engagement by the user 202 within the social networking system 104 involves social networking objects corresponding to "Perris High School," and 2% of all engagement by the user 202 involves social networking objects corresponding to "travel." Thus, the social networking system 104 determines a greater term weight for terms corresponding to "Perris" than to "travel."

Though not illustrated in FIG. 5A, the contextual transcription system 102 can determine frequency weights for terms corresponding to topics in previous messages. For example, in at least one embodiment, the contextual transcription system 102 determines greater term weights for terms that frequently appear within the message thread 208. Additionally, the contextual transcription system 102 can determine term weights for terms corresponding to topics within the message thread 208. For example, the contextual transcription system 102 determines greater term weights for terms corresponding to topics that frequently appear in the message thread 208.

As suggested above, the contextual transcription system 102 can generate term weights based on the determined priority weights and, in some instances, the determined frequency weights for terms. For instance, in some cases, the contextual transcription system 102 selects a highest (or lowest) a priority weight or a frequency weight corresponding to a term as the term weight for the term. Alternatively, in some cases, the contextual transcription system 102 combines the priority weight with the frequency weight to generate the term weight (e.g., a composite term weight). In at least one embodiment, the contextual transcription system 102 adds or averages the priority weight and the frequency weight for a term to determine the term weight for the term.

After or while determining term weights, in at least one embodiment, the contextual transcription system 102 creates a term weight table comprising all identified terms and their corresponding term weights. For example, FIG. 5A illustrates the term weights 512 within a portion of a term weight table. As indicated by FIG. 5A, the contextual transcription system 102 may determine the greatest term weight for the term "Perris" based on determining that the user 202 listed Perris, Calif. as the user's current city. The contextual transcription system 102 may also determine a lesser weight to the phonetically similar term "parents" based on a frequency with which the user 202 mentions the term "parents" in posts or comments. The contextual transcription system 102 may likewise determine an even lesser weight to the phonetically similar term "Paris" based on the user 202 liking or otherwise reacting to a post including the term "Paris."

As suggested above, in some embodiments, the contextual transcription system 102 periodically updates term weights based on updated or more current social networking data. For instance, the contextual transcription system 102 can update the term weight table every day, week, or month, or whenever the user 202 generates a new voice recording. In some embodiments, the contextual transcription system 102 updates the term weight table to account for social networking objects that have been updated within a certain threshold period of time. For example, the contextual transcription system 102 updates the term weight table based on analyzing social networking objects that have been updated within the past year.

Relatedly, in some embodiments, the contextual transcription system 102 updates a term weight based on (or in response to) particular events within the social networking system 104. For example, in some embodiments, the contextual transcription system 102 adjusts a term weight for a term corresponding to a social networking object based on a change within the social networking system 104 associating (or disassociating) the term with the social networking object. Such a change may include, but is not limited to, a change in a name for the user 202, a residency location for the user 202, a person with whom the user 202 is in a relationship.

As a further example, in some cases, the contextual transcription system 102 adjusts a term weight for a term corresponding to a social networking object based on a passage of time since the social networking system 104 associates the term with a social networking object associated with the user 202. The contextual transcription system 102 may incrementally decrease a term weight based on, for instance, a day, week, month, or year since the user 202 mentioned a term in a comment, post, or message.

As yet another example, in certain implementations, the contextual transcription system 102 adjusts a term weight for a term corresponding to a social networking object based on an increase or decrease in frequency with which the user 202 interacts with a social networking object. For example, the contextual transcription system 102 may increase or decrease a term weight based on a corresponding increase or decrease with which the user 202 (i) posts comments mentioning another user or the term, (ii) reacts to (e.g., likes) a post from another user, or (iii) mentions the term in a post, comment, or message. The contextual transcription system can thus dynamically customize term weights for the user 202 by message thread or as changes in the social networking system occur or as time passes.

As suggested above, FIG. 5B illustrates the contextual transcription system 102 performing the act 510 of adjusting transcription-text probabilities based on determined term weights and act 514 of generating a transcript of a voice recording based on the adjusted transcription-text probabilities. As indicated by FIG. 5B, the contextual transcription system 102 accesses transcription-text probabilities 511 generated by the automatic-speech-recognition model 304 and applies the term weights 512 to the transcription-text probabilities 511 to generate adjusted transcription-text probabilities 513.

As suggested by FIG. 5B, the contextual transcription system 102 utilizes the contextual transcription model 318 to generate the adjusted transcription-text probabilities 513. In at least one embodiment, the contextual transcription system 102 multiplies the transcription-text probabilities 511 by the term weights 512 to generate the adjusted transcription-text probabilities 513. Based on analyzing a corresponding voice recording, the automatic-speech-recognition model 304 generates the transcription-text probabilities 511—including a 30% likelihood that a sound (or audio frame) from the voice recording corresponds to "Paris," a 28% likelihood that the sound corresponds to "Parents," and a 25% likelihood that the sound corresponds to "Perris." Additionally, the automatic-speech-recognition model 304 further generates probabilities corresponding to term sequence as part of the transcription-text probabilities 511—including a 20% likelihood that a sound (or audio frame) from the voice recording corresponds to a term sequence "Ice cream at work" and a 22% likelihood that the sound (or audio frame) corresponds to "I scream at work."

As further shown in FIG. 5B, the contextual transcription system 102 accesses the term weights 512 for corresponding transcription-text probabilities. As noted above, the contextual transcription model 318 generates a heavier term weight (e.g., 0.88) for the term "Perris" in comparison to the term weights for the terms "parents" and "Paris." The contextual transcription model 318 likewise generates a heavier term weight for the term sequence "Ice cream at work" than the term weight for the term sequence "I scream at work."

By applying the term weights 512 to the transcription-text probabilities 511, the contextual transcription system 102 generates the adjusted transcription-text probabilities 513. By application of the term weights 512, the adjusted transcription-text probabilities 513 indicate different terms and term sequences have greater probabilities than that indicated by the transcription-text probabilities 511. For example, the adjusted transcription-text probabilities 513 include a higher probability for the term "Perris" (e.g., 22%) than for the term "Paris" (e.g., 6%). Similarly, the adjusted transcription-text probabilities 513 include a higher probability for the term sequence "Ice cream at work" (e.g., 16%) than for the term sequence "I scream at work" (e.g., 6%).

In one or more embodiments, instead of (or in addition to) performing the act 510 of adjusting transcription-text probabilities, the contextual transcription system 102 overrides the transcription-text probabilities 511. In at least one embodiment, the contextual transcription system 102 overrides the transcription-text probabilities 511 based on the term weights 512 meeting a predetermined threshold. For instance, based on the term weights for the term "Perris" (0.88) or the term sequence "Ice cream at work" (0.8) meeting a threshold weight (e.g., "0.78"), the contextual transcription system 102 automatically selects the term "Perris" or the term sequence "Ice cream at work" for inclusion within a transcript.

Similarly, in at least one other embodiment, the contextual transcription system 102 overrides the transcription-text probabilities 511 based on terms or term sequences corresponding to particular social networking object types. The contextual transcription system 102 can insert (into a transcript) terms or term sequences that have been directly input by the user 202 into about-profile-type social networking objects. Based on determining that the user 202 entered "Perris, Calif." as the user's current city, for example, the contextual transcription system 102 automatically inserts the term "Perris" into the transcript.

As further shown in FIG. 5B, the contextual transcription system 102 performs the act 514 of generating the transcript of the voice recording based on the adjusted transcription-text probabilities 513. As indicated above, in some embodiments, the contextual transcription system 102 generates the transcript of the voice recording and provides the transcript to the client device 108a for display within a message thread. For instance, in some embodiments, the contextual transcription system 102 generates the transcript by selecting the terms or term sequences with the greatest adjusted transcription-text probabilities. In some such cases, the contextual transcription system 102 determines one or both of the terms and term sequences corresponding to the greatest adjusted transcription-text probabilities at each consecutive location within a voice recording.

Figure 6:
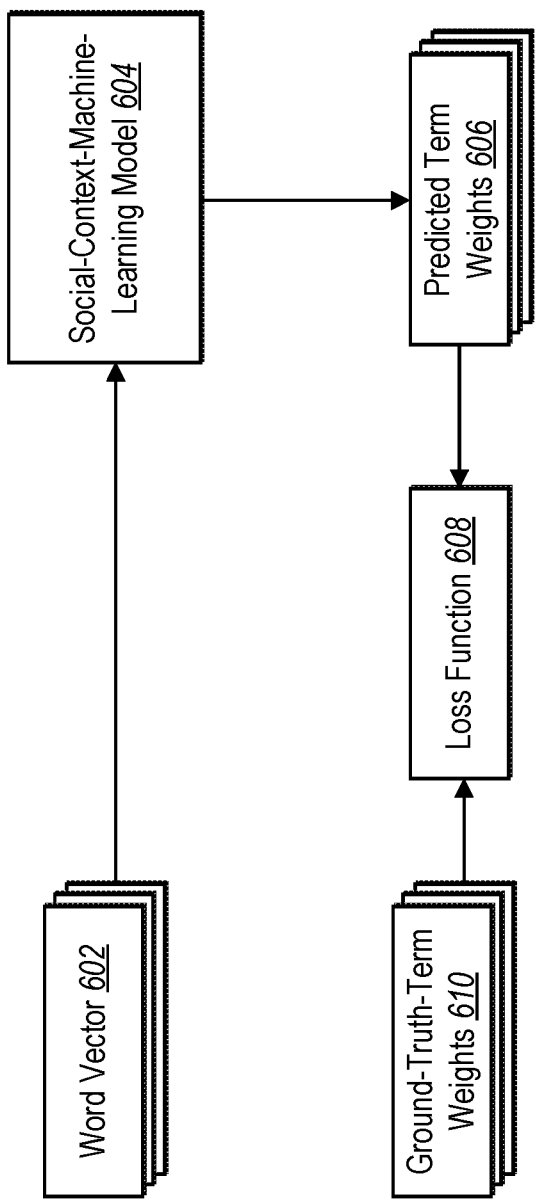
FIG. 6 illustrates predicting term weights by utilizing a machine learning model in accordance with one or more embodiments.

To determine term weights, in one or more embodiments, the contextual transcription system 102 utilizes a trained social-context-machine-learning model. As illustrated in FIG. 6, the contextual transcription system 102 trains a social-context-machine-learning model 604 to determine term weights for a user. In an initial training iteration, for example, the contextual transcription system 102 inputs or feeds a word vector 602 to the social-context-machine-learning model 604 to generate predicted term weights 606 corresponding to terms within the word vector 602. The contextual transcription system 102 subsequently utilizes a loss function 608 to determine a measure of loss between the predicted term weights 606 and ground-truth-term weights 610 for the terms within the word vector 602.

Based on the measure of loss, the contextual transcription system 102 can update parameters of the social-context-machine-learning model 604 to reduce a loss in a subsequent training iteration. By iteratively comparing predicted term weights to ground-truth-term weights and determining a corresponding loss for a word vector, the contextual transcription system 102 can train the social-context-machine-learning model 604 to determine term weights for particular users.

As shown in FIG. 6, the word vector 602 comprise words extracted from the social networking account of the user 202 and compiled or concatenated into a vector. For instance, in some embodiments, the word vector 602 includes text reflecting social networking objects associated with the user 202. Such text may come from profile information for the social networking account of the user 202. In some cases, the word vector 602 also includes text from previous messages. The contextual transcription system 102 generates a vector of the extracted words (e.g., using a word2vec algorithm). In at least one embodiment, the word vector 602 also indicates the type of social networking object corresponding to the particular term within the word vector 602.

As indicated by FIG. 6, in the initial training iteration, the contextual transcription system 102 inputs the word vector 602 into the social-context-machine-learning model 604. In some cases, the social-context-machine-learning model 604 comprises a convolutional neural network, a recurrent neural network, or a Neural-Bag-of-Words model, for example. The social-context-machine-learning model 604 subsequently generates the predicted term weights 606 specific to the user 202. The predicted term weights 606 may include, for example, a predicted weight for each term in the profile information of a social networking account for a user.

As depicted in FIG. 6, the ground-truth-term weights 610 include observed term weights within text generated by a user. For instance, the contextual transcription system 102 weights terms according to occurrence within messages sent or received by a user and within comments and posts by the user. In some cases, the contextual transcription system 102 also factors user transcription corrections into the ground-truth-term weights 610. For example, after displaying the text transcript to a user, the contextual transcription system 102 can present options to correct transcription errors. Based on receiving transcription corrections from the user, the contextual transcription system 102 adjusts the ground-truth-term weights 610.

As mentioned above, the contextual transcription system 102 utilizes the loss function 608 to determine a measure of loss between the ground-truth-term weights 610 and the predicted term weights 606. The contextual transcription system 102 minimizes the determined loss or difference by modifying parameters within the social-context-machine-learning model 604. By adjusting the parameters, the contextual transcription system 102 improves the accuracy of the social-context-machine-learning model 604 through multiple training iterations. Through multiple training iterations, the contextual transcription system 102 modifies internal parameters of the social-context-machine-learning model 604 based on such determined losses until a point of convergence.

After training the social-context-machine-learning model 604, the contextual transcription system 102 can apply the social-context-machine-learning model 604 to determine term weights for a user. For example, in some cases, the contextual transcription system 102 generates a word vector based on terms from the profile information of a social networking account of the user 202 and/or from comments, posts, messages received or sent by the user 202. After inputting the word vector corresponding to the user 202 into the social-context-machine-learning model 604, the social-context-machine-learning model 604 outputs term weights corresponding to terms for the user 202.

Figure 7B:
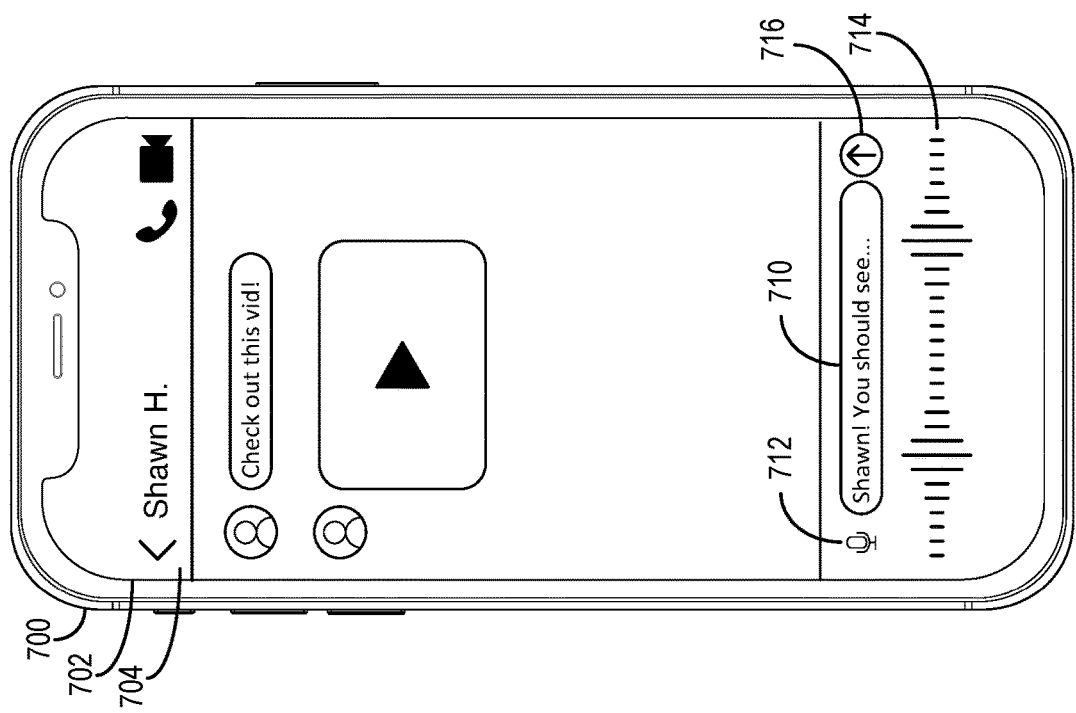
FIGS. 7A-7C illustrate a series of example graphical user interfaces for generating a transcript of a voice recording within a message thread in accordance with one or more embodiments.
Figure 7A:
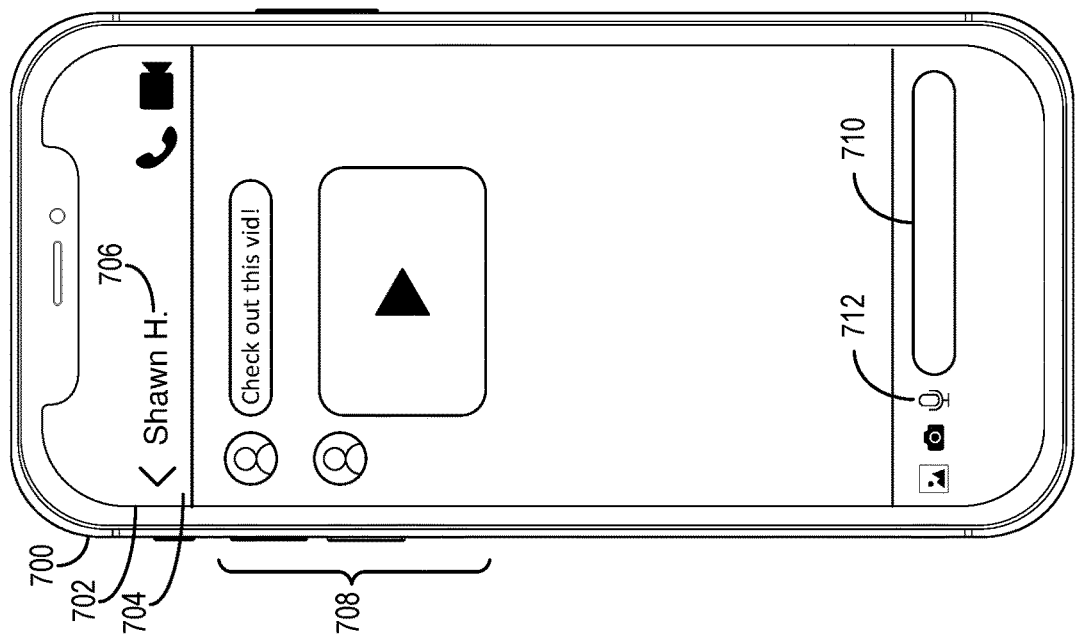
Figure 7C:
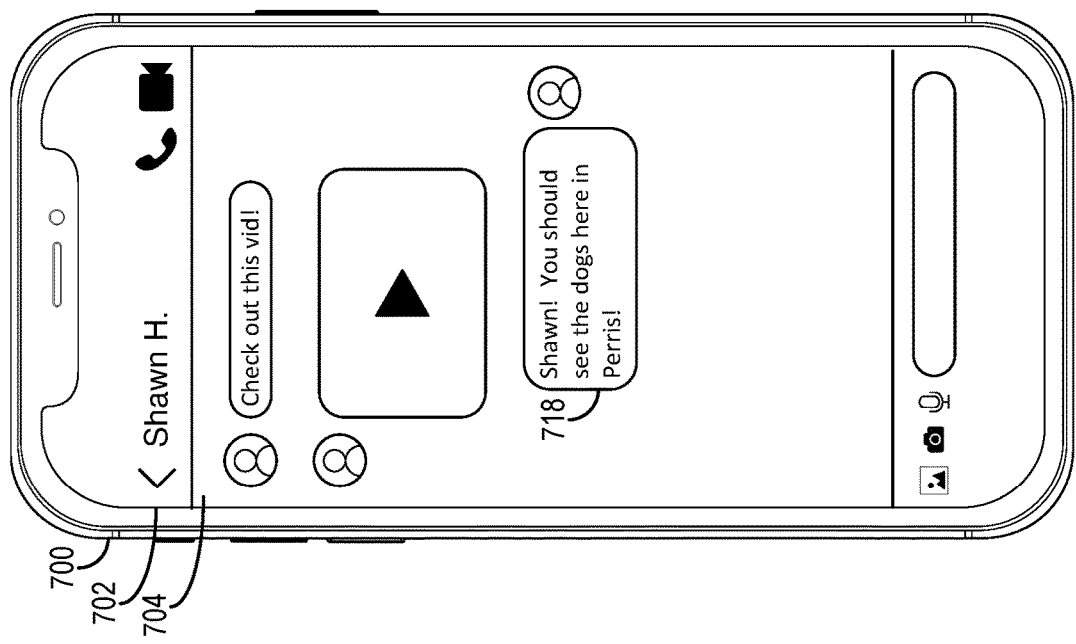

As noted above, the contextual transcription system 102 can provide data to a client device to present graphical user interfaces for a messaging application to the user 202, including messaging user interfaces that include a transcription of a voice recording. FIGS. 7A-7C illustrate a series of messaging user interfaces. FIG. 7A illustrates a client device 700 presenting a messaging user interface before the contextual transcription system 102 begins recording a voice recording. FIG. 7B illustrates the client device 700 presenting a messaging user interface after receiving a transcription of the voice recording. FIG. 7C illustrates the client device 700 presenting a messaging user interface including a transcript within a message. In some embodiments, the client device 700 includes a messaging application comprising computer-executable instructions that cause the client device 700 to perform certain actions depicted in FIGS. 7A-7C.

For example, FIG. 7A illustrates the client device 700 presenting a messaging user interface 704 on a screen 702. In some cases, for instance, the client device 700 may be the client device 108a associated with the user 202. The messaging user interface 704 includes a co-user identifier 706, messages 708, an audio-capture element 712, and a text-input element 710.

The co-user identifier 706 comprises a name or other identifier for the co-user within a message thread corresponding to the messaging user interface 704. The co-user identifier 706 can also indicate two or more co-users within the message thread. As illustrated in FIG. 7A, the co-user identifier 706 indicates that the co-user "Shawn H" is a participant in and receives messages as part of the message thread. Based on user interaction with the co-user identifier 706, the contextual transcription system 102 updates the messaging user interface 704 to include social networking information of the co-user associated with the co-user identifier 706. For example, based on detecting interaction (e.g., a tap or selection) with the co-user identifier 706, the client device 700 presents, to the user 202, the social networking profile of Shawn H.

As further shown in FIG. 8A, the messages 708 include messages sent by the user and/or co-users within the message thread. As indicated above, messages can comprise text messages, image messages, video messages, audio messages, ephemeral messages, and messages of other media types. As illustrated by FIG. 7A, the messages 708 include messages sent to the message thread by the co-user.

Based on detecting user interaction by a user with the text-input element 710, the client device 700 enables the user to send a message to the message thread. The contextual transcription system 102 may present a keyboard to the user for inputting text messages based on detecting interaction with the text-input element 710.

Based on detecting user interaction with the audio-capture element 712, the client device 700 records a voice recording of a message from the user and sends the voice recording to the contextual transcription system 102. Upon receipt of the voice recording, the contextual transcription system 102 begins transcribing the voice recording. In at least one embodiment, the client device 700 records audio using a microphone of the client device 700 for as long as the user holds the audio-capture element 712. Based on detecting that the user released the audio-capture element 712, the client device 700 stops recording the message and generates a corresponding voice recording.

As illustrated in FIG. 7B, the client device 700 updates the messaging user interface 704 based on receiving a transcript of some or all of the voice recording from the contextual transcription system 102. In some cases, the contextual transcription system 102 sends a transcript of the voice recording to the client device 700 after completing transcription of the voice recording. As suggested above, when the client device 700 implements the contextual transcription system 102 within a messaging application, the client device 700 presents the transcript of the voice recording within the messaging user interface 704 upon completing the transcription. Alternatively, the client device 700 presents a portion of the transcript as the contextual transcription system 102 actively transcribes the voice recording. Consistent with such embodiments, FIG. 7B illustrates the client device 700 presenting the messaging user interface 707 on the screen 702 comprising a preview of the transcript. In particular, the messaging user interface 704 includes the audio-capture element 712, the text-input element 710, a send element 716, and an audio visualization 714.

As shown in FIG. 7B, the messaging user interface 704 includes a transcript of the voice recording within the text-input element 710. In particular, after the user 202 vocalizes the desired message and the contextual transcription system 102 transcribes a corresponding voice recording, the client device 700 presents the messaging user interface 704 with transcribed text within the text-input element 710. Alternatively, the client device 700 presents transcribed text within the text-input element 710 as the contextual transcription system 102 actively transcribes portions of a voice recording or audio input. Based on detecting user interaction with the text-input element 710, the client device 700 corrects or otherwise changes the transcript of the voice recording. For example, based on the user selecting the text-input element 710 with the transcript, the client device 700 presents a keyboard with which the user 202 may interact to correct the text within the text-input element 710.

As further shown in FIG. 7B, the messaging user interface 704 also includes the audio visualization 714. In some cases, the client device 700 presents the audio visualization 714 to indicate to the user 202 that the client device 700 detects speech. In some cases, the client device 700 animates the audio visualization 714 based on properties of the voice recording. For instance, the audio visualization 714 reflects amplitude, frequency, rise time, time interval, distortion, and others of the voice recording.

As indicated above, the messaging user interface 704 also includes the send element 716. Based on detecting interaction with the send element 716, the client device 700 enters text within the text-input element 710 for inclusion as a message within the message thread. If the client device 700 receives user corrections of the predicted text transcript, the client device 700 sends the corrected transcript to the social networking system 104 for inclusion within the message thread. Otherwise, the client device 700 sends (and the social networking system 104 includes) the original transcription as a message within the message thread.

In at least one embodiment, the contextual transcription system 102 automatically sends the text transcript for inclusion within the message thread once the voice recording is completed. The client device 700 detects completion of the voice recording based on the user 202 selecting the audio-capture element 712 for an additional time or detecting that the user 202 released the audio-capture element 712. Based on detecting completion of and receiving the voice recording, the contextual transcription system 102 transcribes the voice recording and communicates the corresponding transcript to the social networking system 104 for inclusion as a message within the messaging user interface 704.

FIG. 7C illustrates the client device 700 presenting the messaging user interface 704 after the client device 700 or the social networking system 104 has added a message 718 comprising a transcript of a voice recording to the message thread. As indicated above, in some embodiments, the social networking system 104 or the contextual transcription system 102 sends a transcript of the voice recording to the client device 700 and client devices associated with the co-users for display within the message thread.

As indicated above, the transcript includes terms based on adjusted transcription-text probabilities reflecting contextual understanding. As illustrated in FIG. 7C, the message 718 includes the text "Shawn! You should see the dogs here in Perris!" The contextual transcription system 102, determines, based on the message-thread identifier, that the co-user within the message thread is "Shawn H." Thus, the contextual transcription system 102 capitalizes and spells the word "Shawn" in accordance with the identified social networking data. Additionally, the contextual transcription system 102 spells and capitalizes "Perris" in accordance with contextual understanding. For instance, the contextual transcription system 102 determines that the user currently lives in Perris, Calif.

Figure 8:
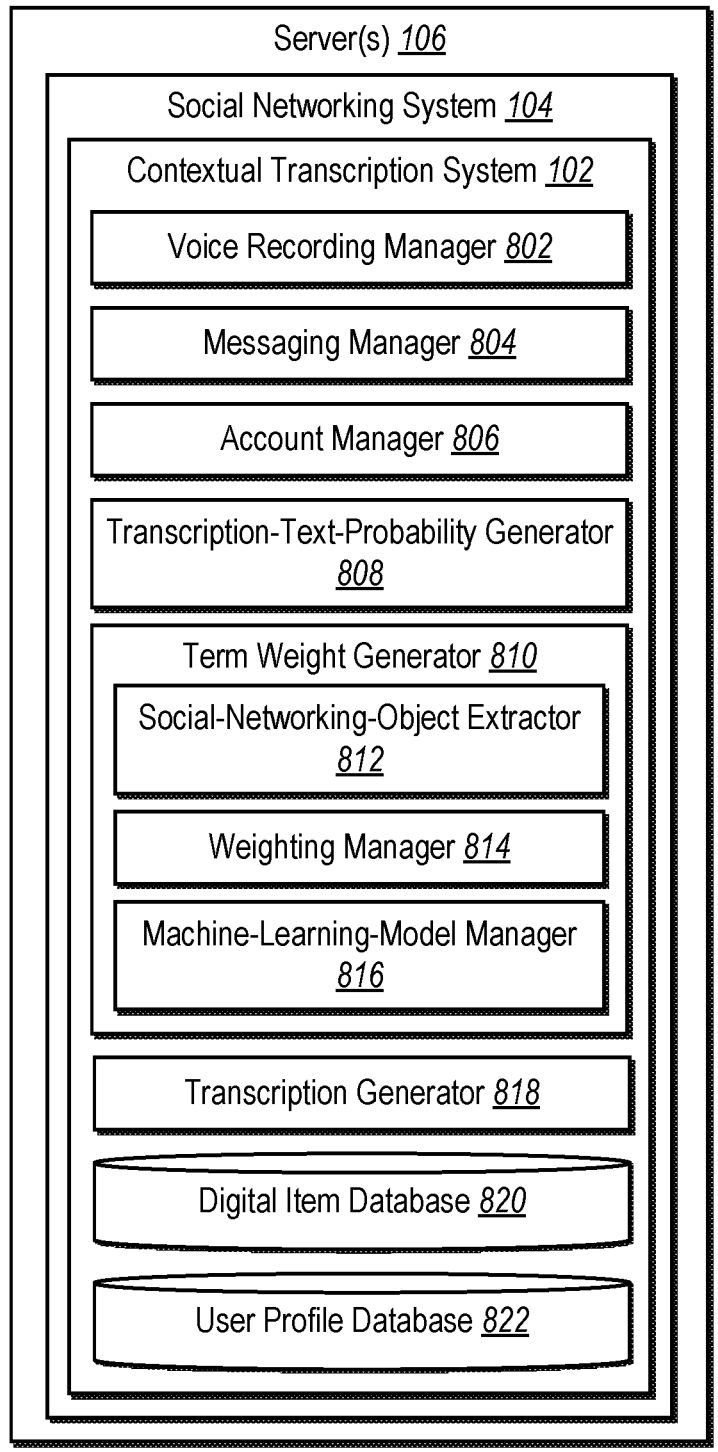
FIG. 8 illustrates an example architecture of the contextual transcription system in accordance with one or more embodiments.

FIG. 8 provides additional detail regarding components and capabilities of the contextual transcription system 102 in accordance with one or more embodiments. As shown in FIG. 8, the contextual transcription system 102 is implemented by the social networking system 104 on the server(s) 106. In other embodiments, the components of the contextual transcription system 102 can be implemented across multiple computing devices, such as the client devices 108a-108n and/or other devices not shown.

As illustrated in FIG. 8, the contextual transcription system 102 includes a voice recording manager 802, a messaging manager 804, an account manager 806, a transcription-text probability generator 808, a term weight generator 810, a transcription generator 818, a digital item database 820, and a user profile database 822. Additional detail regarding each of the components 802-822 will be provided in turn.

As illustrated in FIG. 8, the contextual transcription system 102 includes the voice recording manager 802. The voice recording manager 802 accesses, retrieves, and stores voice recordings from the client device 108a associated with the user 202. The voice recording manager 802 accesses audio recording capabilities of the client device 108a to receive voice recordings. The voice recording manager 802 sends voice recordings to the transcription-text probability generator. Additionally, the voice recording manager stores past voice recordings.

As further depicted in FIG. 8, the messaging manager 804 generates, monitors, and/or manages messages sent within the social networking system 104. For example, the messaging manager 804 can generate message threads including two or more users of the social networking system 104. The messaging manager 804 stores data for each generated message thread including participating users (both past and present), historical messages and message types, message thread identification, privacy settings, and other message-thread-specific data.

The contextual transcription system 102 further includes the account manager 806. The account manager 806 can identify, generate, monitor, and/or manage accounts on the social networking system 104. For example, the account manager 806 can generate one or more social networking accounts for a user and generate information (in accordance with privacy permissions and pertinent privacy regulations) regarding the network account. For example, the account manager 806 can identify other users with permissions to view content items from the social networking account or share content items to connected user network accounts. In addition, the account manager 806 can enable a user to customize the social networking account profile via a number of options and settings. Further, the account manager 806 can store, maintain, an access account information in the user profile database 822

As further shown in FIG. 8, the transcription-text probability generator 808 analyzes voice recordings and generates transcription-text probabilities. In particular, the transcription-text probability generator 808 analyzes voice recordings to extract acoustic features. Based on the extracted acoustic features, the transcription-text probability generator 808 generates transcription-text probabilities.

As also depicted in FIG. 8, the term weight generator 810 accesses and analyzes social networking data and historical messages to generate term weights. The term weight generator 810 generates, manages, and stores term weights. For example, the term weight generator 810 can generate a table comprising term weights. The term weight generator 810 periodically updates the table, and accesses term weights stored within the table.

As shown in FIG. 8, the term weight generator 810 includes a social networking object extractor 812, a weighting manager 814, and a machine-learning-model manager 816. The social networking object extractor 812 accesses, extracts, and stores social networking data from the social networking system 104. More particularly, the social networking object extractor 812 extracts data including social networking objects specific to a user who has recorded a voice recording. The social networking object extractor 812 may also extract social networking data of co-users connected to the user within a message thread.

The weighting manager 814 analyzes features of the extracted social networking objects to apply weights to terms or term sequences. The weighting manager 814 generates, stores, and access weighting rules to apply to terms or term sequences based on social networking objects. The weighting manager 814 can receive weighting rules from a user or from a machine learning model.

The machine-learning-model manager 816 trains and manages the machine learning model for generating term weights. The machine-learning-model manager 816 accesses and stores data relating to text linked to a user's account within the social networking system 104 and within message threads. For example, the social context machine learning model manager accesses text within social networking accounts and text within message threads. Furthermore, the machine-learning-model manager 816 accesses user corrections of generated transcripts.

The transcription generator 818 communicates with the transcription-text probability generator 808 and the term weight generator 810 to retrieve transcription-text probabilities and term weights. The transcription generator 818 identifies data relevant to a particular voice transcription to generate adjusted transcription-text probabilities for a voice recording. Based on the adjusted transcription-text probabilities, the transcription generator 818 generates transcripts. In particular, the transcription generator 818 can generate text messages to send for inclusion within a message thread.

The digital item database 820 maintains digital items for users of the social networking system 104, including information about co-users, other users, and shared digital content. In various embodiments, the user profile database 822 includes social graph information such as edge data and node data. Additional detail regarding the social graph, edges, and nodes, is provided below in relation to FIGS. 11-12.

Figure 9:
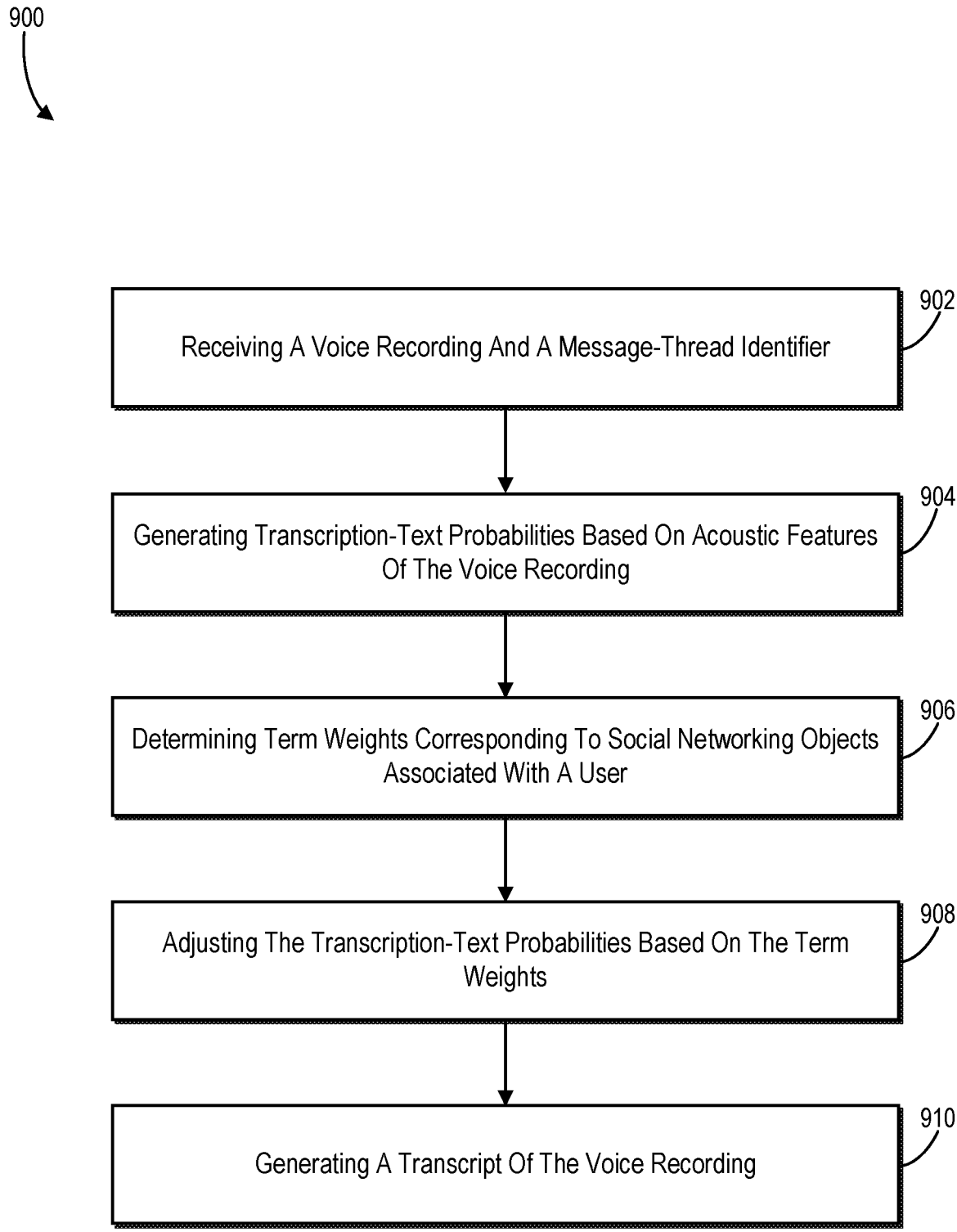
FIG. 9 illustrates a flowchart of a series of acts of receiving a voice recording and generating a transcript of the voice recording in accordance with one or more embodiments.

FIGS. 1-8, the corresponding text, and the examples provide several different systems, methods, techniques, components, and/or devices of the contextual transcription system 102 in accordance with one or more embodiments. In addition to the above description, one or more embodiments can also be described in terms of flowcharts including acts for accomplishing a particular result. For example, FIG. 9 illustrates a flowchart of an example sequence of an act in accordance with one or more embodiments. In addition, FIG. 9 may be performed with more or fewer acts. Further, the acts may be performed in different orders. The acts described herein may be repeated or performed in parallel with one another or parallel with different instances of the same or similar acts.

To illustrate, FIG. 9 illustrates a flowchart of the series of acts 900 of generating a transcript of a voice recording in accordance with one or more embodiments. As shown in FIG. 9, the series of acts 900 includes an act 902 of receiving a voice recording and a message-thread identifier. In particular, the act 902 comprises receiving, from a computing device associated with a user, a voice recording and a message-thread identifier corresponding to a message thread for the user and one or more co-users.

The series of acts 900 includes an act 904 of generating transcription-text probabilities based on acoustic features of the voice recording. In particular, the act 904 comprises generating transcription-text probabilities for transcribing the voice recording based on acoustic features of the voice recording.

The series of acts 900 includes an act 906 of determining term weights corresponding to social networking objects associated with a user. In particular, the act 906 comprises determining term weights for terms corresponding to objects associated with the user within a social networking system. The act 906 can further comprise generating a priority weight for the term corresponding to the object associated with the user within the social networking system based on a particular object type for the object; and determining the term weight for the term based on the priority weight. Additionally, the act 906 can comprise generating a frequency weight for the term based on a frequency with which the user interacts with the object within the social networking system or mentions the term within the social networking system; and determining the term weight for the term based on the priority weight and the frequency weight.

The act 906 can further comprise determining a term weight for a term corresponding to an object associated with the user within the social networking system based on: a particular object type for the object associated with one or both of the user and a co-user of the one or more co-users within the social networking system; and a frequency with which one or both of the user and the co-user interact with the object within the social networking system or mentions the term within the social networking system. The act 906 can further comprise wherein determining the term weights for the terms comprises giving more weight to a term corresponding to an object associated with the user within the social networking system based on: the term matching a co-user account name of the one or more co-users; the term matching a location designated by the user for an account of the user; the object corresponding to a particular relationship type between the user and the one or more co-users; a relatively higher frequency of interaction with the object by the user within the social networking system; or a relatively higher frequency of mention by the user within comments of the social networking system.

The series of acts 900 includes an act 908 of adjusting the transcription-text probabilities based on the term weights. In particular, the act 908 comprises adjusting the transcription-text probabilities for transcribing the voice recording based on the term weights. In some cases, adjusting the transcription-text probabilities for transcribing the voice recording based on the term weights comprises: identifying a term or a term unit corresponding to a term weight based in part on a particular object type for an object associated with the user within the social networking system; and adjusting a transcription-text probability for the term or the term unit from the transcription-text probabilities based on the term weight; and generating the transcript of the voice recording comprises selecting the term or the term unit corresponding to the term weight for inclusion in the transcript of the voice recording rather than an alternative term or an alternative term unit indicated by unadjusted transcription-text probabilities.

The act 908 can further comprise comprising adjusting a term weight for a term corresponding to an object associated with the user within the social networking system based in part on: a change within the social networking system associating the term with the object associated with the user within the social networking system; a passage of time since the social networking system associates the term with the object associated with the user within the social networking system; or an increase in frequency with which the user interacts with the object within the social networking system or mentions the term within the social networking system.

The series of acts 900 includes an act 910 of generating a transcript of the voice recording. In particular, the act 910 comprises generating, for display within the message thread corresponding to the message-thread identifier, a transcript of the voice recording based on the adjusted transcription-text probabilities.

The series of acts 900 can further comprise the acts of utilizing an automatic-speech-recognition model to generate the transcription-text probabilities for transcribing the voice recording; and utilizing a trained social-context-machine-learning model to determine the term weights for the terms corresponding to the objects associated with the user within the social networking system.

Additionally, the series of acts 900 can comprise the acts of determining that a term weight for a term meets a predetermined threshold; and based on the term weight meeting the predetermined threshold, automatically determining to use the term within the transcript of the voice recording.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
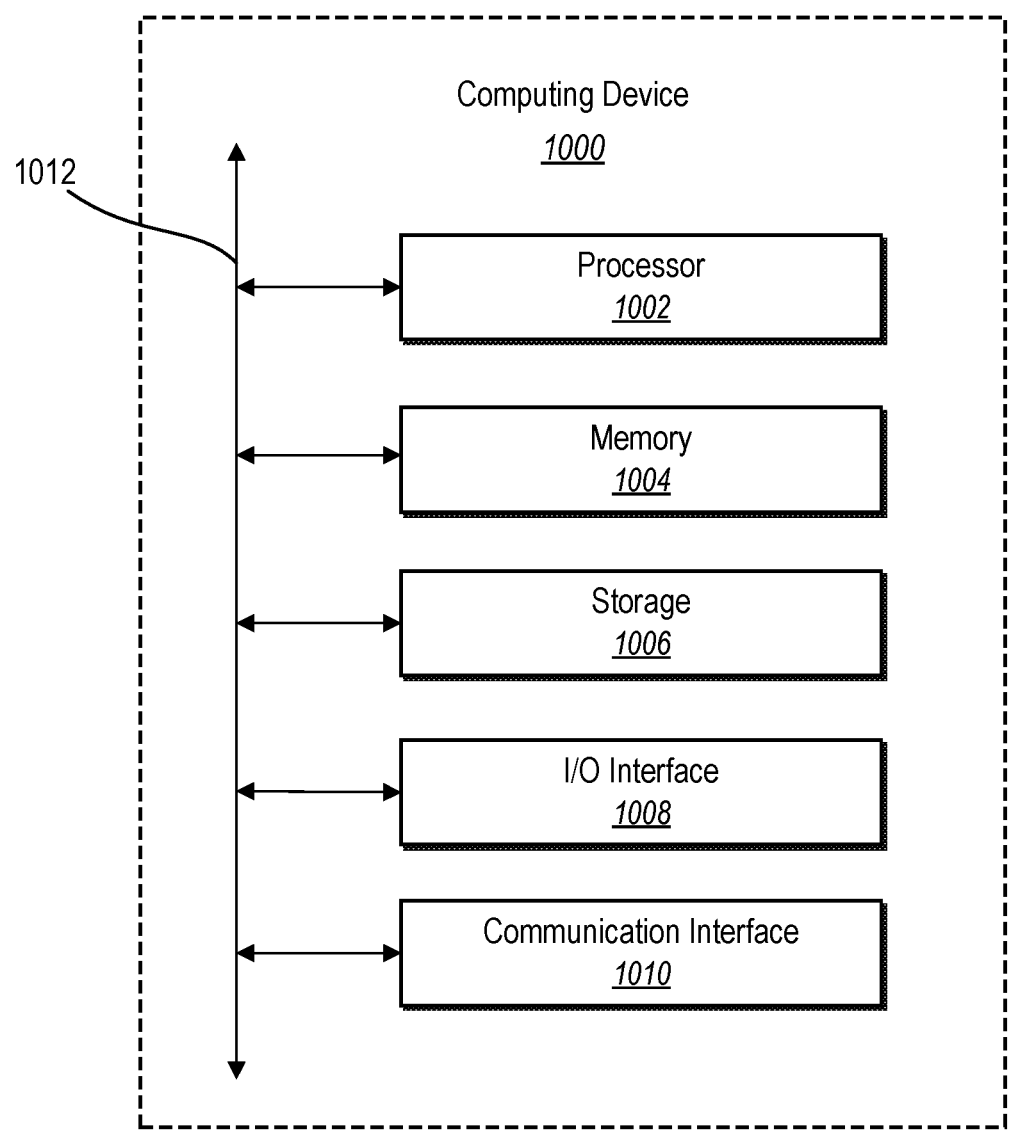
FIG. 10 illustrates a block diagram of an example computing device for implementing one or more embodiments of the present disclosure.

FIG. 10 illustrates a block diagram of a computing device 1000 that may be configured to perform one or more of the processes described above. One will appreciate that one or more computing devices such as the computing device 1000 may implement the contextual transcription system 102. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While the computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. For example, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. For example, the processor 1002 may include one or more instruction caches, one or more data caches, and one or more translation lookaside buffers (TLBs). Instructions in the instruction caches may be copies of instructions in the memory 1004 or the storage device 1006.

The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The storage device 1006 includes storage for storing data or instructions. For example, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, another known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (e.g., packet-based communication) between the computing device 1000 and one or more other computing devices or networks. For example, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1010 may facilitate communications with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination thereof.

Additionally, the communication interface 1010 may facilitate communications across various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that connects components of the computing device 1000 to each other. For example, the communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the contextual transcription system 102 can operate as a social networking system in various embodiments. In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users.

Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 11:
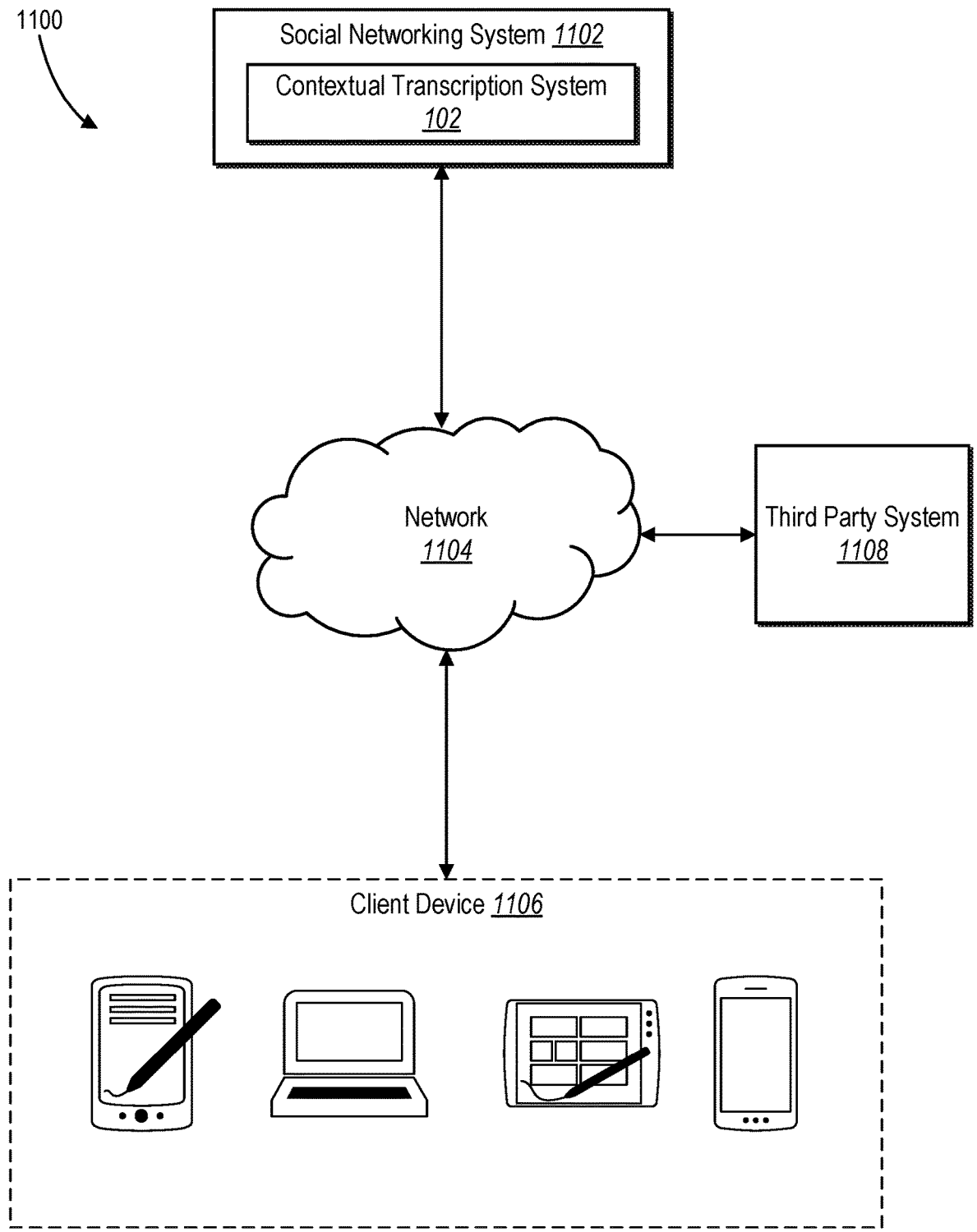
FIG. 11 illustrates an example network environment of a social networking system in accordance with one or more embodiments.

FIG. 11 illustrates an example network environment 1100 of a networking system. The network environment 1100 includes a social networking system 1102, a client device 1106, and a third-party system 1108 connected to each other by a network 1104. Although FIG. 11 illustrates a particular arrangement of the social networking system 1102, the client device 1106, the third-party system 1108, and the network 1104, this disclosure contemplates any suitable arrangement of the devices, systems, and networks. For example, the client device 1106 and the social networking system 1102 may be physically or logically co-located with each other in whole, or in part. Moreover, although FIG. 11 illustrates a client device 1106, the social networking system 1102, the third-party system 1108, and the network 1104, this disclosure contemplates any suitable number of devices, systems, and networks.

This disclosure contemplates any suitable network. For example, one or more portions of the network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1104 may include one or more networks.

Links may connect the social networking system 1102, the client device 1106, and the third-party system 1108 to the network 1104 or to each other. In particular embodiments, one or more links include one or more wireline (e.g., Digital Subscriber Line (DSL) or Data Over Cable Service Interface Specification (DOCSIS)), wireless (e.g., Wi-Fi or Worldwide Interoperability for Microwave Access (WiMAX)), or optical (e.g., Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1100. One or more first links may differ in one or more respects from one or more second links.

In particular embodiments, the client device 1106 may be an electronic device including hardware, software, or embedded logic components or a combination of two or more such components and capable of carrying out the appropriate functionalities implemented or supported by the client device 1106. For example, the client device 1106 may include any of the computing devices discussed above in relation to FIG. 10. The client device 1106 may enable a network user to access the network 1104. The client device 1106 may enable its user to communicate with other users associated with other client devices.

In particular embodiments, the client device 1106 may include a web browser, such as MICROSOFT INTERNET EXPLORER, GOOGLE CHROME, MOZILLA FIREFOX, APPLE SAFARI, and may have one or more add-ons, plug-ins, or other extensions (e.g., toolbars). A user at the client device 1106 may enter a Uniform Resource Locator (URL) or other address directing the web browser to a particular server (such as server, or a server associated with the third-party system 1108), and the web browser may generate a Hypertext Transfer Protocol (HTTP) request and communicate the HTTP request to server. The server may accept the HTTP request and communicate to the client device 1106 one or more Hypertext Markup Language (HTML) files responsive to the HTTP request.

The client device 1106 may render a webpage based on the HTML files from the server for presentation to the user. For example, webpages may render from HTML files, Extensible Hypertext Markup Language (XHTML) files, or Extensible Markup Language (XML) files, according to particular needs. Such pages may also execute scripts such as those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social networking system 1102 may be a network-addressable computing system that can host an online network of users (e.g., a social networking system or an electronic messaging system). In some embodiments, such as the illustrated embodiment, the social networking system 1102 implements the contextual transcription system 102.

The social networking system 1102 may generate, store, receive, and send networking data, such as user-profile data, concept-profile data, graph information (e.g., social-graph information), or other suitable data related to the online network of users. The social networking system 1102 may be accessed by the other components of network environment 1100 either directly or via the network 1104. In particular embodiments, the social networking system 1102 may include one or more servers. Each server may be a unitary server or a distributed server spanning multiple computers or multiple datacenters. Servers may be of various types, such as web server, news server, mail server, message server, advertising server, file server, application server, exchange server, database server, proxy server, another server suitable for performing functions or processes described herein, or any combination thereof.

In one or more embodiments, each server may include hardware, software, or embedded logic components or a combination of two or more such components for carrying out the appropriate functionalities implemented or supported by a server. In particular embodiments, the social networking system 1102 may include one or more data stores. Data stores may be used to store various types of information. In particular embodiments, the information stored in data stores may be organized according to specific data structures. In particular embodiments, each data store may be a relational, columnar, correlation, or another suitable database. Although this disclosure describes or illustrates particular types of databases, this disclosure contemplates any suitable types of databases. Particular embodiments may provide interfaces that enable the social networking system 1102, the client device 1106, or the third-party system 1108 to manage, retrieve, modify, add, or delete, the information stored in a data store.

In particular embodiments, the social networking system 1102 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. The social networking system 1102 may provide users of the online network of users the ability to communicate and interact with other users. In particular embodiments, users may join the online network of users via the social networking system 1102 and then add connections (e.g., relationships) to a number of other users of the social networking system 1102 whom they want to be connected to. Herein, the term "friend" may refer to any other user of the social networking system 1102 with whom a user has formed a connection, association, or relationship via the social networking system 1102.

In particular embodiments, the social networking system 1102 may provide users with the ability to take actions on various types of items or objects, supported by the social networking system 1102. For example, the items and objects may include groups or social networks to which users of the social networking system 1102 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social networking system 1102 or by an external system of the third-party system 1108, which is separate from the social networking system 1102 and coupled to the social networking system 1102 via the network 1104.

In particular embodiments, the social networking system 1102 may be capable of linking a variety of entities. For example, the social networking system 1102 may enable users to interact with each other as well as receive content from the third-party systems 1108 or other entities, or to allow users to interact with these entities through an application programming interfaces (API) or other communication channels.

In particular embodiments, the third-party system 1108 may include one or more types of servers, one or more data stores, one or more interfaces, including but not limited to APIs, one or more web services, one or more content sources, one or more networks, or any other suitable components, e.g., that servers may communicate with. The third-party system 1108 may be operated by a different entity from an entity operating the social networking system 1102. In particular embodiments, however, the social networking system 1102 and the third-party systems 1108 may operate in conjunction with each other to provide social networking services to users of the social networking system 1102 or the third-party systems 1108. In this sense, the social networking system 1102 may provide a platform, or backbone, which other systems, such as the third-party systems 1108, may use to provide social networking services and functionality to users across the Internet.

In particular embodiments, the third-party system 1108 may include a third-party content object provider. A third-party content object provider may include one or more sources of content objects, which may be communicated to a client device 1106. For example, content objects may include information regarding things or activities of interest to the user, such as movie showtimes, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social networking system 1102 also includes user-generated content objects, which may enhance a user's interactions with the social networking system 1102. User-generated content may include anything a user can add, upload, send, or "post" to the social networking system 1102. For example, a user communicates posts to the social networking system 1102 from a client device 1106. Posts may include data such as status updates or other textual data, location information, photos, videos, links, music or other similar data or media. Content may also be added to the social networking system 1102 by a third-party through a "communication channel," such as a newsfeed or stream.

In particular embodiments, the social networking system 1102 may include a variety of servers, sub-systems, programs, modules, logs, and data stores. In particular embodiments, the social networking system 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social networking system 1102 may also include suitable components such as network interfaces, security mechanisms, load balancers, failover servers, management-and-network-operations consoles, other suitable components, or any suitable combination thereof. In particular embodiments, the social networking system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. For example, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social networking system 1102 to one or more client device 1106 or one or more the third-party system 1108 via the network 1104. The web server may include a mail server or other messaging functionality for receiving and routing messages between the social networking system 1102 and one or more client device 1106. An API-request server may allow the third-party system 1108 to access information from the social networking system 1102 by calling one or more APIs. An action logger may be used to receive communications from a web server about a user's actions on or off social networking system 1102. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106. Authorization servers may be used to enforce one or more privacy settings of the users of the social networking system 1102. A privacy setting of a user determines how particular information associated with a user can be shared. The authorization server may allow users to opt in to or opt out of having their actions logged by the social networking system 1102 or shared with other systems (e.g., the third-party system 1108), such as by setting appropriate privacy settings. Third-party-content-object stores may be used to store content objects received from third parties, such as the third-party system 1108. Location stores may be used for storing location information received from client device 1106 associated with users. Advertisement-pricing modules may combine social information, the current time, location information, or other suitable information to provide relevant advertisements, in the form of notifications, to a user.

Figure 12:
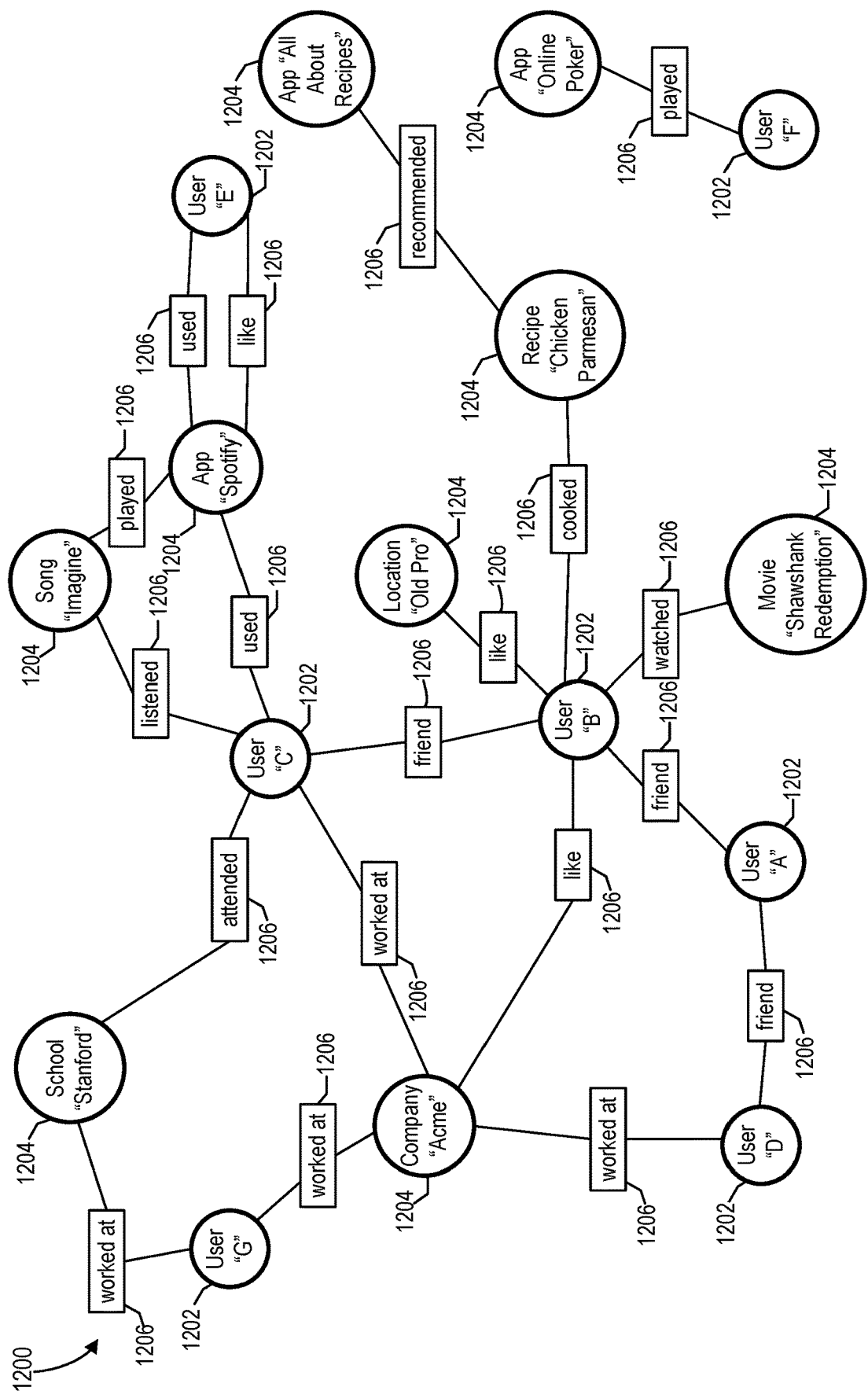
FIG. 12 illustrates a social graph in accordance with one or more embodiments.

FIG. 12 illustrates an example social graph 1200. In particular embodiments, the social networking system 1102 may store the social graph 1200 and additional social graphs in one or more data stores. In particular embodiments, social graph 1200 may include multiple nodes— which may include multiple user nodes 1202 or multiple concept nodes 1204—and multiple edges 1206 connecting the nodes. The social graph 1200 illustrated in FIG. 12 is shown, for didactic purposes, in a two-dimensional visual map representation. In particular embodiments, the social networking system 1102, the client device 1106, or the third-party system 1108 may access the social graph 1200 and related social-graph information for suitable applications. The nodes and edges of social graph 1200 may be stored as data objects, for example, in a data store (such as a social-graph database). Such a data store may include one or more searchable or quarriable indexes of nodes or edges of social graph 1200.

In particular embodiments, a user node 1202 may correspond to a user of the social networking system 1102. For example, a user may be an individual (human user), an entity (e.g., an enterprise, business, or third-party application), or a group (e.g., of individuals or entities) that interacts or communicates with or over social networking system 1102. In particular embodiments, when a user registers for an account with the social networking system 1102, the social networking system 1102 may create a user node 1202 corresponding to the user and store the user node 1202 in one or more data stores. Users and user nodes 1202 described herein may, where appropriate, refer to registered users and user nodes 1202 associated with registered users. In addition, or as an alternative, users and user nodes 1202 described herein may, where appropriate, refer to users that have not registered with the social networking system 1102. In particular embodiments, a user node 1202 may be associated with information provided by a user or information gathered by various systems, including the social networking system 1102. For example, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1204 may correspond to a concept. For example, a concept may correspond to a place (e.g., a movie theater, restaurant, landmark, or city); a website (e.g., a website associated with social networking system 1102 or a third-party website associated with a web-application server); an entity (e.g., a person, business, group, sports team, or celebrity); a resource (e.g., an audio file, video file, digital photo, text file, structured document, or application) which may be located within the social networking system 1102 or on an external server, such as a web-application server; real or intellectual property (e.g., a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including the social networking system 1102. For example, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1204 may be associated with one or more data objects corresponding to information associated with concept node 1204. In particular embodiments, a concept node 1204 may correspond to one or more webpages.

In particular embodiments, a node in the social graph 1200 may represent or be represented by a webpage (which may be referred to as a "profile page"). Profile pages may be hosted by or accessible to the social networking system 1102. Profile pages may also be hosted on third-party websites associated with a third-party system 1108. For example, a profile page corresponding to a particular external webpage may be the particular external webpage, and the profile page may correspond to a particular concept node 1204. Profile pages may be viewable by all or a selected subset of other users. For example, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In particular embodiments, a concept node 1204 may represent a third-party webpage or resource hosted by the third-party system 1108. The third-party webpage or resource may include, among other elements, content, a selectable or another icon, or another inter-actable object (which may be implemented, for example, in JavaScript, AJAX, or PHP codes) representing an action or activity. For example, a third-party webpage may include a selectable icon such as "like," "check-in," "eat," "recommend," or another suitable action or activity. A user viewing the third-party webpage may perform an action by selecting one of the icons (e.g., "eat"), causing a client device 1106 to send to the social networking system 1102 a message indicating the user's action. In response to the message, the social networking system 1102 may create an edge (e.g., an "eat" edge) between a user node 1202 corresponding to the user and a concept node 1204 corresponding to the third-party webpage or resource and store edge 1206 in one or more data stores.

In particular embodiments, a pair of nodes in the social graph 1200 may be connected to each other by one or more edges 1206. An edge 1206 connecting a pair of nodes may represent a relationship between the pair of nodes. In particular embodiments, an edge 1206 may include or represent one or more data objects or attributes corresponding to the relationship between a pair of nodes. For example, a first user may indicate that a second user is a "friend" of the first user. In response to this indication, the social networking system 1102 may send a "friend request" to the second user. If the second user confirms the "friend request," social networking system 1102 may create an edge 1206 connecting the first user's user node to the second user's user node in the social graph 1200 and store edge 1206 as social-graph information in one or more of data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes, this disclosure contemplates any suitable edges 1206 with any suitable attributes connecting the user nodes 1202. For example, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1200 by one or more edges 1206.

In particular embodiments, an edge 1206 between a user node 1202 and a concept node 1204 may represent a particular action or activity performed by a user associated with user node 1202 toward a concept associated with the concept node 1204. For example, as illustrated in FIG. 12, a user may "like," "attended," "played," "listened," "cooked," "worked at," or "watched" a concept, each of which may correspond to an edge type or subtype. A concept-profile page corresponding to a concept node 1204 may include, for example, a selectable "check-in" icon (e.g., a clickable "check-in" icon) or a selectable "add to favorites" icon. Similarly, after a user clicks these icons, the social networking system 1102 may create a "favorite" edge or a "check-in" edge in response to a user's action corresponding to a respective action.

As another example and not by way of limitation, a user (user "C") may listen to a particular song ("Ramble On") using a particular application (SPOTIFY, which is an online music application). In this case, the social networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, the social networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (SPOTIFY) on an external audio file (the song "Imagine"). Although this disclosure describes particular edges 1206 with particular attributes connecting the user nodes 1202 and concept nodes 1204, this disclosure contemplates any suitable edges 1206 with any suitable attributes connecting the user nodes 1202 and concept nodes 1204.

Furthermore, although this disclosure describes edges between a user node 1202 and a concept node 1204 representing a single relationship, this disclosure contemplates edges between a user node 1202 and a concept node 1204 representing one or more relationships. For example, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "SPOTIFY").

In particular embodiments, the social networking system 1102 may create an edge 1206 between a user node 1202 and a concept node 1204 in the social graph 1200. For example, a user viewing a concept-profile page (e.g., by using a web browser or a special-purpose application hosted by the user's client device 1106) may indicate that he or she likes the concept represented by the concept node 1204 by clicking or selecting a "Like" icon, which may cause the user's client device 1106 to send to the social networking system 1102 a message indicating the user's liking of the concept associated with the concept-profile page. In response to the message, the social networking system 1102 may create an edge 1206 between user node 1202 associated with the user and concept node 1204, as illustrated by "like" edge 1206 between the user and concept node 1204. In particular embodiments, the social networking system 1102 may store an edge 1206 in one or more data stores. In particular embodiments, an edge 1206 may be automatically formed by the social networking system 1102 in response to a particular user action. For example, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on the social networking system 1102).

A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a predetermined area of a profile page of a user or other page, presented with additional information associated with the advertiser, bumped up or otherwise highlighted within news feeds or tickers of other users, or otherwise promoted. The advertiser may pay to have the social action promoted. For example, advertisements may be included among the search results of a search-results page, where sponsored content is promoted over non-sponsored content.

In particular embodiments, an advertisement may be requested for display within social networking system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. For example, the user may view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social networking system 1102 may execute or modify a particular action of the user.

An advertisement may also include social networking-system functionality that a user may interact with. For example, an advertisement may enable a user to "like" or otherwise endorse the advertisement by selecting an icon or link associated with the endorsement. As another example and not by way of limitation, an advertisement may enable a user to search (e.g., by executing a query) for content related to the advertiser. Similarly, a user may share the advertisement with another user (e.g., through the social networking system 1102) or RSVP (e.g., through the social networking system 1102) to an event associated with the advertisement. In addition, or as an alternative, an advertisement may include a social networking system context directed to the user. For example, an advertisement may display information about a friend of the user within the social networking system 1102 who has taken an action associated with the subject matter of the advertisement.

In particular embodiments, the social networking system 1102 may determine the social-graph affinity (which may be referred to herein as "affinity") of various social-graph entities for each other. Affinity may represent the strength of a relationship or level of interest between particular objects associated with the online network of users, such as users, concepts, content, actions, advertisements, other objects associated with the online network of users, or any suitable combination thereof. Affinity may also be determined with respect to objects associated with the third-party systems 1108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social networking system 1102 may measure or quantify social-graph affinity using an affinity coefficient (which may be referred to herein as "coefficient"). The coefficient may represent or quantify the strength of a relationship between particular objects associated with the online network of users. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online network of users. For example, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social networking system 1102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user. For example, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. For example, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social networking system 1102 may calculate a coefficient based on a user's actions. The social networking system 1102 may monitor such actions on the online network of users, on the third-party system 1108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, the social networking system 1102 may calculate a coefficient based on the user's actions with particular types of content. The content may be associated with the online network of users, the third-party system 1108, or another suitable system. The content may include users, profile pages, posts, news stories, headlines, instant messages, chat room conversations, emails, advertisements, pictures, video, music, other suitable objects, or any combination thereof. The social networking system 1102 may analyze a user's actions to determine whether one or more of the actions indicate an affinity for the subject matter, content, other users, and so forth. For example, if a user may make frequently posts content related to "coffee" or variants thereof, the social networking system 1102 may determine the user has a high coefficient with respect to the concept "coffee." Particular actions or types of actions may be assigned a higher weight and/or rating than other actions, which may affect the overall calculated coefficient. For example, if a first user emails a second user, the weight or the rating for the action may be higher than if the first user views the user-profile page for the second user.

In particular embodiments, the social networking system 1102 may calculate a coefficient based on the type of relationship between particular objects. Referencing the social graph 1200, the social networking system 1102 may analyze the number and/or type of edges 1206 connecting particular user nodes and concept nodes 1204 when calculating a coefficient. For example, user nodes 1202 that are connected by a spouse-type edge (representing that the two users are married) may be assigned a higher coefficient than a user nodes 1202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. For example, if a user is tagged in a first photo, but merely likes a second photo, the social networking system 1102 may determine that the user has a higher coefficient with respect to the first photo than the second photo because having a tagged-in-type relationship with content may be assigned a higher weight and/or rating than having a like-type relationship with content.

In some embodiments, the social networking system 1102 may calculate a coefficient for a first user based on the relationship one or more second users have with a particular object. In other words, the connections and coefficients other users have with an object may affect the first user's coefficient for the object. For example, if a first user is connected to or has a high coefficient for one or more second users, and those second users are connected to or have a high coefficient for a particular object, the social networking system 1102 may determine that the first user should also have a relatively high coefficient for the particular object.

In one or more embodiments, the coefficient may be based on the degree of separation between particular objects. The degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends."

Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1200. For example, social-graph entities that are closer in the social graph 1200 (i.e., fewer degrees of separation) may have a higher coefficient than entities that are further apart in the social graph 1200.

In particular embodiments, the social networking system 1102 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 1106 of the user). A first user may be more interested in other users or concepts that are closer to the first user. For example, if a user is one mile from an airport and two miles from a gas station, the social networking system 1102 may determine that the user has a higher coefficient for the airport than the gas station based on the proximity of the airport to the user.

In particular embodiments, the social networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social networking system 1102 may provide information that is relevant to a user's interests and current circumstances, increasing the likelihood that they will find such information of interest.

In some embodiments, the social networking system 1102 may generate content based on coefficient information. Content objects may be provided or selected based on coefficients specific to a user. For example, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object.

In one or more embodiments, the social networking system 1102 may generate search results based on coefficient information. The search results for a particular user may be scored or ranked based on the coefficient associated with the search results with respect to the querying user. For example, search results corresponding to objects with higher coefficients may be ranked higher on a search-results page than results corresponding to objects having lower coefficients.

In particular embodiments, the social networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online network of users, from the third-party system 1108 (e.g., via an API or another communication channel), or from another suitable system. In response to the request, the social networking system 1102 may calculate the coefficient (or access the coefficient information if it has previously been calculated and stored).

In various embodiments, the social networking system 1102 may measure an affinity with respect to a particular process. Different processes (both internal and external to the online network of users) may request a coefficient for a particular object or set of objects. The social networking system 1102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, filed Oct. 1, 2012, each of which is incorporated by reference in their entirety.

In particular embodiments, one or more of the content objects of the online network of users may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online network of users. Where the privacy settings for an object allow a particular user to access that object, the object may be described as being "visible" with respect to that user. For example, a user of the online network of users may specify privacy settings for a user-profile page identify a set of users that may access the work experience information on the user-profile page, thus excluding other users from accessing the information.

In particular embodiments, the privacy settings may specify a "blocked list" of users that should not be allowed to access certain information associated with the object. In other words, the blocked list may specify one or more users or entities for which an object is not visible. For example, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online network of users. For example, a particular concept node 1204 corresponding to a particular photo may have a privacy setting specifying that the photo may only be accessed by users tagged in the photo and their friends.

In particular embodiments, privacy settings may allow users to opt in or opt out of having their actions logged by the social networking system 1102 or shared with other systems (e.g., the third-party system 1108). In particular embodiments, the privacy settings associated with an object may specify any suitable granularity of permitted access or denial of access. For example, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of the third-party systems 1108, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, the social networking system 1102 may send a request to the data store for the object. The request may identify the user associated with the request and may only be sent to the user (or a client device 1106 of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user.

In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
   receiving, from a computing device associated with a user, a voice recording and a message-thread identifier corresponding to a message thread for the user and one or more co-users;
   generating transcription-text probabilities of terms for transcribing the voice recording from acoustic features of the voice recording;
   determining term weights for the terms utilizing priority weights for the terms generated from historical terms utilized by the user and the one or more co-users within one or more message threads and utilizing frequency weights for the terms generated from frequencies with which the user mentions the terms within a social networking system;
   adjusting the transcription-text probabilities of the terms for transcribing the voice recording based on the term weights; and
   generating, for display within the message thread corresponding to the message-thread identifier, a transcript of the voice recording based on the adjusted transcription-text probabilities of the terms.

2. The method of claim 1, further comprising generate the priority weights to indicate a likelihood of the user speaking particular terms.

3. The method of claim 1, further comprising determining a term weight for a term utilizing a historical term utilized by the user and the one or more co-users within the message thread for the user and the one or more co-users.

4. The method of claim 1, further comprising determining a term weight for a term utilizing a frequency with which the user and the one or more co-users mention the historical terms within the one or more message threads.

5. The method of claim 1, wherein adjusting the transcription-text probabilities of the terms for transcribing the voice recording based on the term weights comprises:
   identifying a term or a term unit corresponding to a term weight based in part on the historical terms utilized by the user and the one or more co-users within the one or more message threads and the frequencies with which the user mentions the terms within the social networking system;
   adjusting a transcription-text probability for the term or the term unit from the transcription-text probabilities based on the term weight; and
   generating the transcript of the voice recording comprises selecting the term or the term unit corresponding to the term weight for inclusion in the transcript of the voice recording rather than an alternative term or an alternative term unit indicated by unadjusted transcription-text probabilities.

6. The method of claim 1, wherein determining the term weights for the terms is based in part on:
   a change within a social networking system associating a term from the terms with social networking data associated with the user within the social networking system;
   a passage of time since the social networking system associates the term with the social networking data associated with the user within the social networking system; or
   an increase in frequency with which the user mentions the term within the social networking system.

7. The method of claim 1, wherein determining the term weights for the terms comprises giving more weight to a term that corresponds to an object associated with the user within a social networking system based on:
   the term matching a co-user account name of the one or more co-users;
   the term matching a location designated by the user for an account of the user;
   the object corresponding to a particular relationship type between the user and the one or more co-users;
   a relatively higher frequency of interaction with the object by the user within the social networking system; or
   a relatively higher frequency of mention by the user within comments of the social networking system.

8. The method of claim 1, further comprising:
   utilizing an automatic-speech-recognition model to generate the transcription-text probabilities for transcribing the voice recording; and
   utilizing a trained social-context-machine-learning model to determine the term weights for the terms corresponding to a social networking data associated with the user within the social networking system.

9. The method of claim 1, further comprising:
   providing, for display within a message user interface corresponding to the message thread, a selectable audio-capture element in relation to a text-input element; and
   based on detecting a user interaction with the selectable audio-capture element:
      capturing the voice recording; and
      transmitting the transcript of the voice recording within the message thread to the one or more co-users.

10. A non-transitory computer readable medium storing instructions thereon that, when executed by at least one processor, cause a computer system to:
    receive, from a computing device associated with a user, a voice recording and a message-thread identifier corresponding to a message thread for the user and one or more co-users;
    generate transcription-text probabilities of terms for transcribing the voice recording from acoustic features of the voice recording;
    determine term weights for the terms utilizing priority weights for the terms generated from historical terms utilized by the user and the one or more co-users within one or more message threads and utilizing frequency weights for the terms generated from frequencies with which the user mentions the terms within a social networking system;

adjust the transcription-text probabilities of the terms for transcribing the voice recording based on the term weights; and generate, for display within the message thread corresponding to the message-thread identifier, a transcript of the voice recording based on the adjusted transcription-text probabilities of the terms.

11. The non-transitory computer readable medium as recited in claim 10, further comprising instructions that, when executed by the at least one processor, cause the computer system to generate the priority weights to indicate a likelihood of the user speaking particular terms.

12. The non-transitory computer readable medium as recited in claim 10, further comprising instructions that, when executed by the at least one processor, cause the computer system to determine a term weight for a term utilizing a historical term utilized by the user and the one or more co-users within the message thread for the user and the one or more co-users.

13. The non-transitory computer readable medium as recited in claim 10, further comprising instructions that, when executed by the at least one processor, cause the computer system to determine a term weight for a term utilizing a frequency with which the user and the one or more co-users mention the historical terms within the one or more message threads.

14. The non-transitory computer readable medium as recited in claim 10, further comprising instructions that, when executed by the at least one processor, cause the computer system to adjust the transcription-text probabilities of the terms for transcribing the voice recording based on the term weights by:

identifying a term or a term unit corresponding to a term weight based in part on the historical terms utilized by the user and the one or more co-users within the one or more message threads and the frequencies with which the user mentions the terms within the social networking system;

adjusting a transcription-text probability for the term or the term unit from the transcription-text probabilities based on the term weight; and generate the transcript of the voice recording by selecting the term or the term unit corresponding to the term weight for inclusion in the transcript of the voice recording rather than an alternative term or an alternative term unit indicated by unadjusted transcription-text probabilities.

15. A system comprising:

at least one processor; and at least one non-transitory computer readable medium storing instructions thereon that, when executed by the at least one processor, cause the system to:

receive, from a computing device associated with a user, a voice recording and a message-thread identifier corresponding to a message thread for the user and one or more co-users;

generate transcription-text probabilities of terms for transcribing the voice recording from acoustic features of the voice recording;

determine term weights for the terms utilizing priority weights for the terms generated from historical terms utilized by the user and the one or more co-users within one or more message threads and utilizing frequency weights for the terms generated from frequencies with which the user mentions the terms within a social networking system;

adjust the transcription-text probabilities of the terms for transcribing the voice recording based on the term weights; and generate, for display within the message thread corresponding to the message-thread identifier, a transcript of the voice recording based on the adjusted transcription-text probabilities of the terms.

16. The system as recited in claim 15, further comprising instructions that, when executed by the at least one processor, cause the system to generate the priority weights to indicate a likelihood of the user speaking particular terms.

17. The system as recited in claim 15, further comprising instructions that, when executed by the at least one processor, cause the system to determine a term weight for a term utilizing a historical term utilized by the user and the one or more co-users within the message thread for the user and the one or more co-users.

18. The system as recited in claim 15 further comprising instructions that, when executed by the at least one processor, cause the system to determine a term weight for a term utilizing a frequency with which the user and the one or more co-users mention the historical terms within the one or more message threads.

19. The system as recited in claim 15, further comprising instructions that, when executed by the at least one processor, cause the system to adjust the transcription-text probabilities of the terms for transcribing the voice recording based on the term weights by:

identifying a term or a term unit corresponding to a term weight based in part on the historical terms utilized by the user and the one or more co-users within the one or more message threads and the frequencies with which the user mentions the terms within the social networking system;

adjusting a transcription-text probability for the term or the term unit from the transcription-text probabilities based on the term weight; and generating the transcript of the voice recording by selecting the term or the term unit corresponding to the term weight for inclusion in the transcript of the voice recording rather than an alternative term or an alternative term unit indicated by unadjusted transcription-text probabilities.

20. The system as recited in claim 15 further comprising instructions that, when executed by the at least one processor, cause the system to:

utilize an automatic-speech-recognition model to generate the transcription-text probabilities for transcribing the voice recording; and utilize a trained social-context-machine-learning model to determine the term weights for the terms corresponding to a social networking data associated with the user within the social networking system.

* * * * *